United States Patent [19]

Dickson

[11] Patent Number: 5,341,727
[45] Date of Patent: Aug. 30, 1994

[54] POSITIONING MECHANISM

[75] Inventor: J. Douglas Dickson, Columbus, Ohio

[73] Assignee: Gas Research Institute, Chicago, Ill.

[21] Appl. No.: 886,509

[22] Filed: May 20, 1992

[51] Int. Cl.⁵ ............................................. A47J 37/06
[52] U.S. Cl. ...................................... 99/335; 99/349; 99/353; 99/377; 99/379; 100/93 P
[58] Field of Search ....................... 99/326–328, 99/331, 335, 332, 336, 342–349, 375, 377–379, 390, 391, 400, 372, 383, 389, 394, 424–426, 430; 219/524, 525, 443; 100/93 P, 233; 126/39 H, 41 R, 41 A–41 C

[56] References Cited

U.S. PATENT DOCUMENTS

| Re. 32,994 | 7/1989 | Adamson et al. |
|---|---|---|
| 2,009,791 | 7/1935 | Shroyer . |
| 2,033,060 | 3/1936 | Anderson . |
| 2,039,218 | 4/1936 | Gouoroff . |
| 2,607,287 | 8/1952 | Price . |
| 2,632,379 | 3/1953 | Kudo . |
| 3,209,677 | 10/1965 | Nanna . |
| 3,312,161 | 4/1967 | Nanna . |
| 4,027,139 | 5/1977 | Theimer . |
| 4,586,428 | 5/1986 | Adamson . |
| 4,601,237 | 7/1986 | Harter et al. . |
| 4,627,335 | 12/1986 | Sherman et al. ............... 219/524 X |
| 4,697,504 | 10/1987 | Keating . |
| 4,700,619 | 10/1987 | Scanlon . |
| 4,729,296 | 3/1988 | Sabin . |
| 4,763,571 | 8/1988 | Bergling et al. . |
| 4,852,545 | 8/1989 | Sherman et al. ............... 126/39 H |
| 4,878,424 | 11/1989 | Adamson . |
| 4,913,040 | 4/1990 | Sherman et al. . |
| 4,938,126 | 7/1990 | Rubio et al. ............... 99/353 X |
| 4,972,766 | 11/1990 | Anetsberger ............... 99/349 |
| 4,987,827 | 1/1991 | Marquez ............... 99/331 |
| 4,989,580 | 2/1991 | Dunham . |
| 5,070,775 | 12/1991 | Blake . |
| 5,095,813 | 3/1992 | Escamilla et al. ............... 100/93 P X |
| 5,178,059 | 1/1993 | Eschlboeck et al. ............... 99/349 |
| 5,197,377 | 3/1993 | Jennings et al. ............... 99/379 X |

Primary Examiner—Timothy F. Simone
Attorney, Agent, or Firm—Watkins, Dunbar & Pollick

[57] ABSTRACT

A gas-fired, double-sided griddle apparatus for high-volume commercial cooking comprises double-sided griddles, each having a lower platen having a horizontal lower cooking surface and an upper platen having an upper cooking surface; a positioning mechanism for moving the upper platen of each griddle into a horizontal position in contact with the food, permitting the upper platen to press downward against the food until the cooking surface reaches a predetermined level above the cooking surface of the lower platen, stopping the downward movement at that level, and lifting the upper platen away from the food after a predetermined cooking time; a counterflow heater for heating a supply of oil to desired temperatures; and apparatus for circulating the heated oil through a serpentine path wherein the oil contacts, and transfers heat to, a first region of the lower platen and a similar path wherein the oil transfers heat to a second region of the upper platen that is positioned directly above, and parallel to, the first region while cooking food located between the two regions of the platens. A weight controlled valve in the oil circulating apparatus maintains substantially constant pressure in the oil.

8 Claims, 13 Drawing Sheets

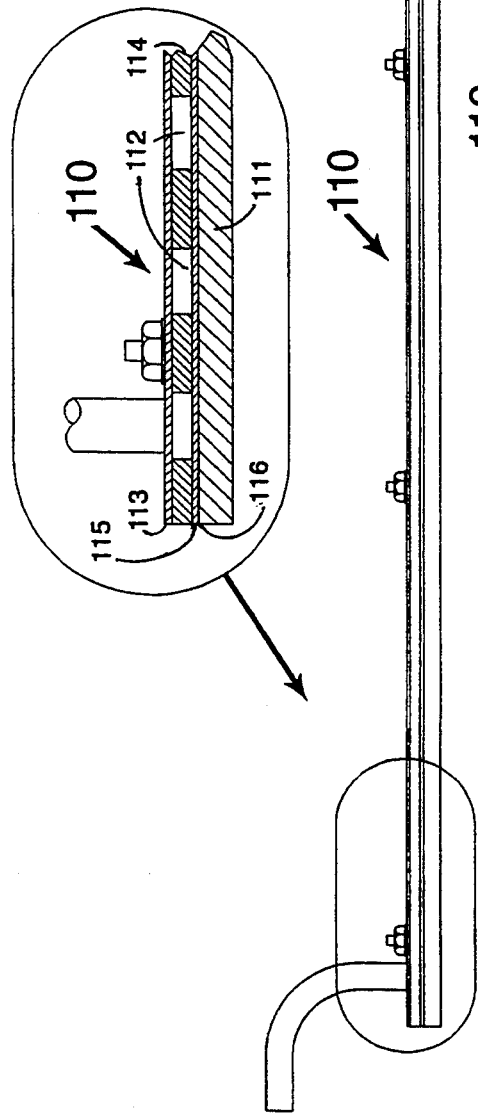
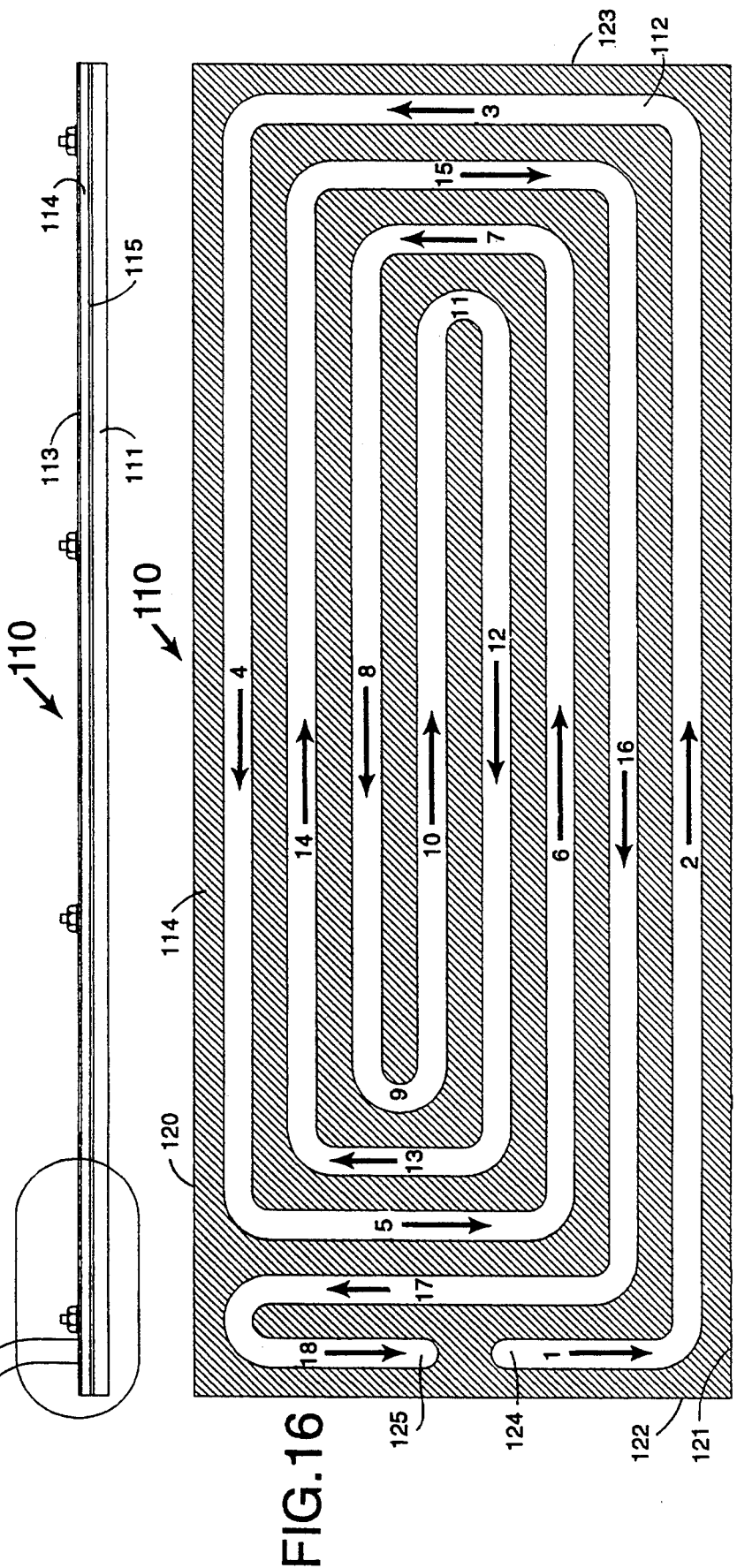

POSITIONING MECHANISM

CROSS REFERENCES

The present invention is related to the subject matter disclosed in the following United States patent applications and patents, all of which are incorporated herein by reference:

Ser. No. 07/886,323, filed May 20, 1992, by Paul E. George, II, Richard E. Wendorf, and Bruce E. Taber, for Weight Controlled Valve; now U.S. Pat. No. 5,236,010, issued Aug. 17, 1993.

Ser. No. 07/953,557, filed Sep. 29, 1992, by Paul E. George, II, and John S. Barnhart, for Heat Exchanger; now U.S. Pat. No. 5,287,919.

Ser. No. 07/886,272, filed May 20, 1992, by Paul E. George II, Donald E. Fritzsche, J. Douglas Dickson, and John S. Barnhart, for High-Volume Cooking; now U.S. Pat. No. 5,247,874, issued Sep. 28, 1993.

As filed, the following pre-claim text, the drawings, and the abstract herein are identical to the corresponding portions of the above-mentioned application for High-Volume Cooking, as filed, except that the present text includes an additional section headed "Position Mechanism Summary." The claims are different in each application.

The following disclosure includes, with slight revision, the paper "A Gas-Fired, Double-Sided Griddle for High-Volume Commercial Cooking", by Paul E. George, II, John D. Dickson, and Donald E. Fritzsche; presented May 21, 1991, at the 1991 International Appliance Technical Conference held at University of Wisconsin-Madison; Madison Wis., U.S.A. May 21–22, and published in the Proceedings of the 42nd Annual International Appliance Technical Conference, pp. 51–65.

BACKGROUND, FIELD, PRIOR ART

To increase the speed of cooking in high-production environments or where customer service time is crucial, food can be griddled from both sides simultaneously by placing a heated surface in contact with the top. Not only does this process decrease cooking time by a factor of two or more, it also improves quality.

A typical gas-fired double-sided griddle according to the present invention provides outstanding temperature uniformity, fast response, and high efficiency, including low idle energy consumption.

A circulating hot oil system as shown in FIG. 8 transfers heat to the cooking surfaces from a gas-fired oil heater as shown in FIG. 9, located below the griddle. A simple, effective, and robust system shown in FIGS. 2–7 positions the upper platens to maintain intimate contact with the food without excessively compressing soft foods.

Heating on a hot flat surface has been one of the mainstays of food preparation for thousands of years, as evidenced by scorched rocks found in archeological digs. The process, now called griddling, cooks rapidly by effectively conducting heat from the griddle to the food. Griddling also provides a rapidly seared food surface that seals in juices. Most foods are cooked from both sides sequentially; they are flipped about half way through the cooking process. Although a variety of foods are prepared on griddles, hamburgers are the dominant product. Hamburgers are particularly adapted to preparation in this way since the natural oils melted out of the meat form an effective heat transfer medium between the meat and the griddle. Texturing or puncturing the hamburger surface increases cooking speed by providing a convective path for hot grease to reach the center of the patty.

To increase the speed of cooking in high-production environments or where customer service time is crucial, food can be griddled from both sides simultaneously by placing a heated surface in contact with the top. Not only does this process decrease cooking time by a factor of two or more, it also improves quality. Because both sides are seared simultaneously, more natural juices are retained. The operator-dependent flipping operation is eliminated, thus improving product consistency.

Electrically heated top platens have been used by two major food chains for several years. These devices were commercially successful but deficient in performance because of the high operating cost of resistance electric heating, the high installation cost to rewire for the high power draw, and overheating of those portions of the griddle not in contact with food.

SUMMARY

The gas-fired double-sided griddle of the present invention eliminates these problems and improves surface temperature uniformity while providing very fast response. A circulating hot oil system transfers heat to the cooking surfaces from a gas-fired oil heater located below the griddle. A simple, effective, and robust system positions the upper platens to maintain intimate contact with the food without excessively compressing soft foods.

Typical apparatus for cooking according to the present invention comprises double-sided griddle means having a lower platen providing a horizontal lower cooking surface and an upper platen providing an upper cooking surface; means for positioning the upper cooking surface in a predetermined sequence before, during, and after cooking; means for heating a supply of oil to temperatures within a predetermined range; and means for circulating the heated oil through a serpentine path wherein the oil contacts, and transfers heat to, a substantial first region of the lower platen and a serpentine path wherein the oil contacts, and transfers heat to, a substantial second region of the upper platen that is positioned directly above, and parallel to, the first region while cooking food located between the first and second regions of the platens.

The positioning means typically comprises means for moving the upper platen into a horizontal position in contact with the food, permitting the upper platen to press downward against the food until the cooking surface reaches a predetermined level above the cooking surface of the lower platen, stopping the downward movement at that level, and lifting the upper platen away from the food after a predetermined cooking time; and preferably comprises apparatus substantially as disclosed in FIGS. 1–7 and the associated description herein.

Preferably the heating means comprises gas burning counterflow apparatus substantially as disclosed in FIG. 9 and the associated description herein.

The oil circulating means typically comprises apparatus substantially as disclosed in FIG. 8 and the associated description herein; including a weight controlled valve substantially as disclosed in FIGS. 13–15 and the associated description herein, for maintaining substantially constant pressure in the circulating oil.

Preferably the circulating means comprises also a heat exchanger substantially as disclosed in FIGS. 16–18 and the associated description herein.

In typical apparatus according to the invention platen temperature is controlled by a solenoid valve that is either open if the platen is below a predetermined set point or closed if the platen is above the set point; a dead band of about 3° to 8° F. is included in the controller; when the solenoid valve opens, hot oil flows through the platen and heats the cooking surface; when the valve closes, hot oil is trapped inside the platen, and as the oil cools, the platen temperature rises until the metal and oil equilibrate.

DRAWINGS

FIG. 16 is a schematic sectional plan view of a typical heat exchanger according to the present invention.

FIG. 17 is a schematic edge view of the same heat exchanger.

FIG. 18 is an enlarged sectional view of the portion of the heat exchanger that is encircled in FIG. 17.

PREFERRED EMBODIMENTS

Circulating Oil System

Figure 8:
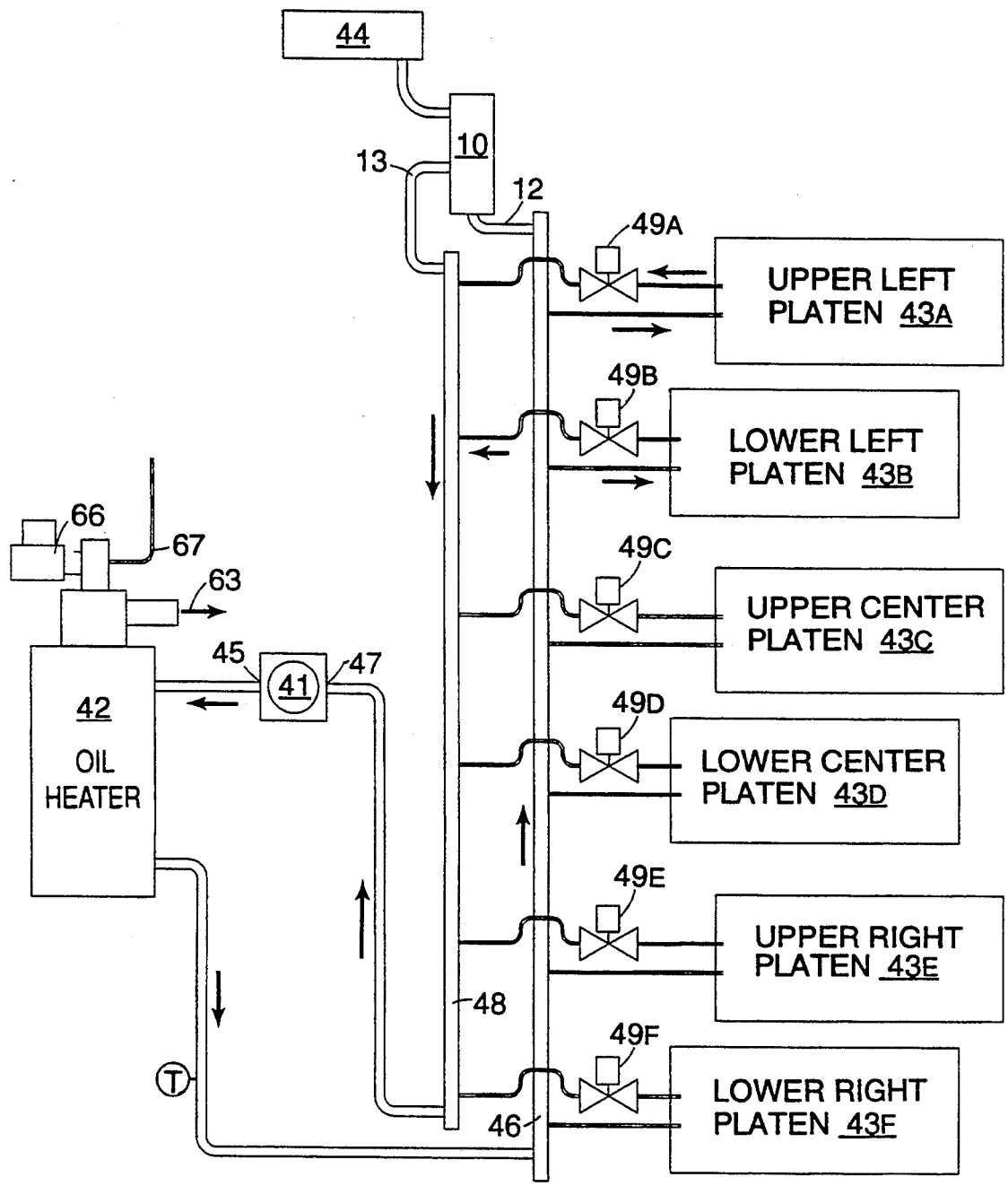
FIG. 8 is a schematic diagram showing a typical hot oil system for a gas-fired double-sided griddle for high-volume commercial cooking in which the valve in FIGS. 13–15 is especially useful.

A schematic diagram of the circulating oil system is shown in FIG. 8. The system comprises a pump 41, an oil heater 42, a supply manifold 46, a return manifold 48, a pressure control valve 10, six (or more) platens 43A–43F, and their associated control valves 49A–49F. The platens 43 are flat heat exchange surfaces bolted to the backs of the cooking surfaces as shown in FIGS. 17 and 18. The success of the system depends largely on a ready supply of hot oil 23 that can be immediately circulated through a platen 43 when heat is needed. Maintaining a proper differential pressure between the supply and return manifolds 46,48 and balancing the thermal inertia of the platens 43 with the amount of oil 23 introduced to the platen are also important. Surface temperature uniformity is achieved by an improved method of passing oil 23 through the platens 43.

Platen temperature is controlled by a solenoid valve 49 which is either open if the platen 43 is below set point or closed if the platen 43 is above set point. A five-degree dead band is included in the controller. When the solenoid valve 49 opens, hot oil 23 flows through the platen 43 and heats the cooking surface. When the valve 49 closes, hot oil 23 is trapped inside the platen 43. As the oil cools, the platen temperature rises until the metal and oil equilibrate. The platen 43 is designed so that a full charge of oil at 450° F. will not cause the platen to heat more than about 15° above set point even under low-temperature conditions. For example, if the control set point is 250° F., and the platen temperature drops below 247.5° F., the solenoid valve 49 opens until the platen temperature rises to 252.5° F. and then closes. The heat capacity of the platen 43 is over 15 times that of the oil 23, so the equilibrium temperature without heat loss is less than 256° F. When cooking, the temperature overshoot is actually lowered by the heat load on the platen 43. As platen temperature is increased to 350° F., the amount of overshoot drops since the oil 23 must cool less before matching the platen temperature. Heat loss from the platen is also higher so that overshoot is almost nonexistent at 350° F.

The minimum mass of the platens 43 is defined by temperature overshoot; the maximum is not constrained. However, quickest response is obtained by platens with the minimum mass. Fortunately the response time of the platens is more dependent on surface contact between the oil 23 and platen 43 than on the total mass of oil in the system. One key to successful operation of the griddle is to maximize oil side heat transfer area and minimize oil inventory in the platen.

An oil temperature controller turns the burner 62 on or off to maintain the oil temperature, leaving the heater 42 between 420° and 450° F. Oil 23 is circulated continuously through the oil heater 42. In fact, the oil flow through the heater 42 is independent of the number of platens in service. The burner 62 is turned on when the oil leaving the heater 42 drops below 420° and off when it rises to 450°. Since the heater 42 is designed to increase oil temperature about 15°, all the oil 23 in the supply/return system is at least 435° F. when the burner turns off. With the burner 62 off, the temperature exiting the heater 42 equals the entering temperature, and the minimum oil temperature is 420° F. During idle operation (no platens calling for oil), the burner 62 runs less than five minutes every hour.

Figure 15:
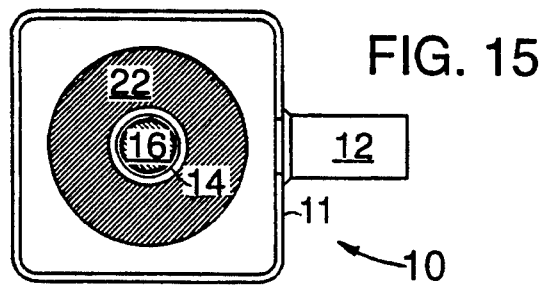
FIG. 15 is a top sectional view of the valve in FIG. 13, taken in the plane 3—3 in FIG. 13.
Figure 13:
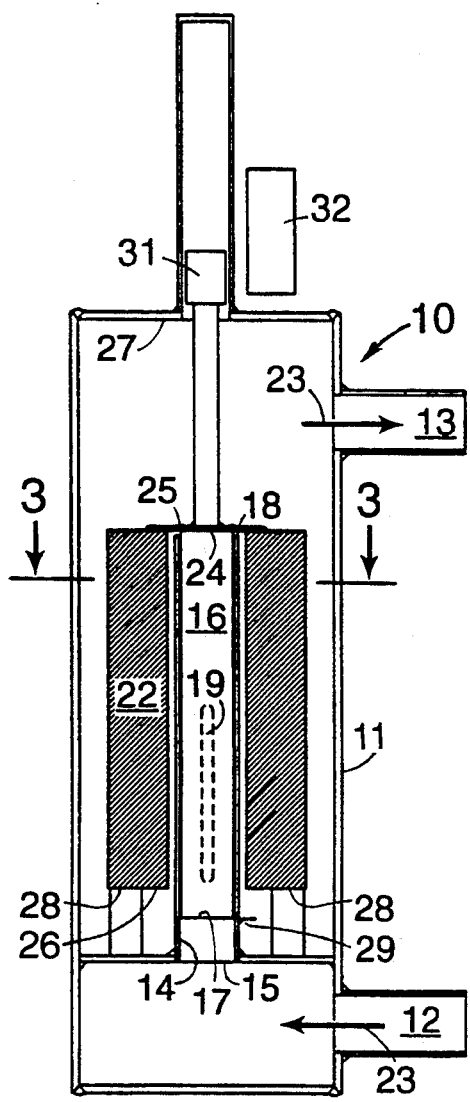
FIG. 13 is a partly schematic front sectional view of a typical weight controlled valve according to the present invention, showing the weight and piston in their lowest position.
Figure 14:
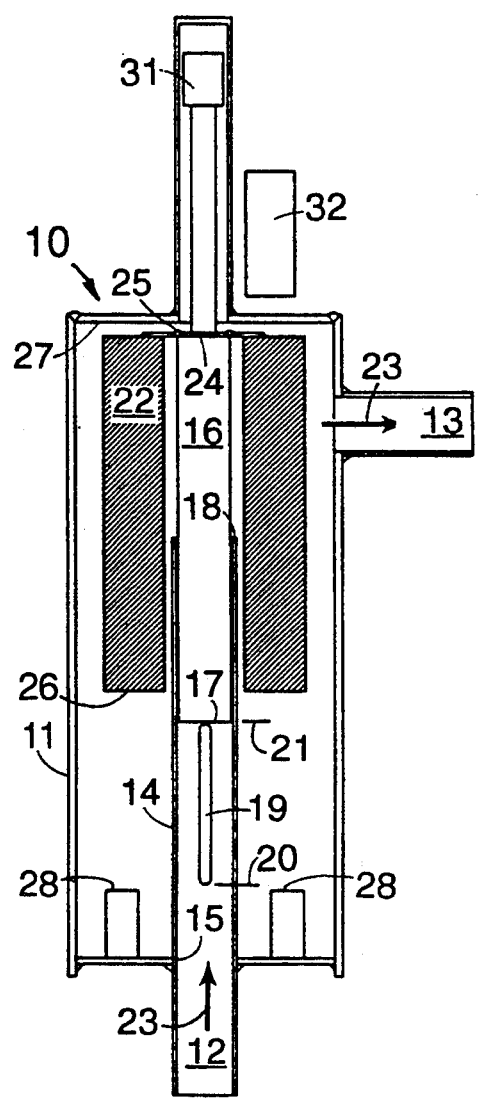
FIG. 14 is a similar view of the same valve (except for an alternative, slightly modified, inlet portion at the bottom), showing the weight and piston in their highest position.

The pressure differential between the supply and return manifolds 46,48 is maintained by a special dead-weight valve 10, shown in detail in FIGS. 13–15. A weight 22 is supported by the pressure differential between the manifolds 46,48 and rises or falls to increase or decrease flow as needed to maintain constant differential pressure. Because the design flow through the oil heater 42 is greater than the required flow with all platens 43 on, the weight 22 "floats" whenever the pump 41 is running and a magnetic switch 31,32 on the weight ensures that adequate oil flow is available to the heater 42 before the burner is allowed to operate. Because the pump 41 sees constant head (pressure), the flow through the oil heater 42 is constant. Frictional pressure drop introduces only minor variations in oil flow. The dead-weight valve 10 is located at the opposite end of the manifolds 46, 48 from the supply and return connection to eliminate dead spots. When configured as shown in FIG. 8, the entire supply manifold 46 is filled with hot oil 23 at all times.

Figure 9:
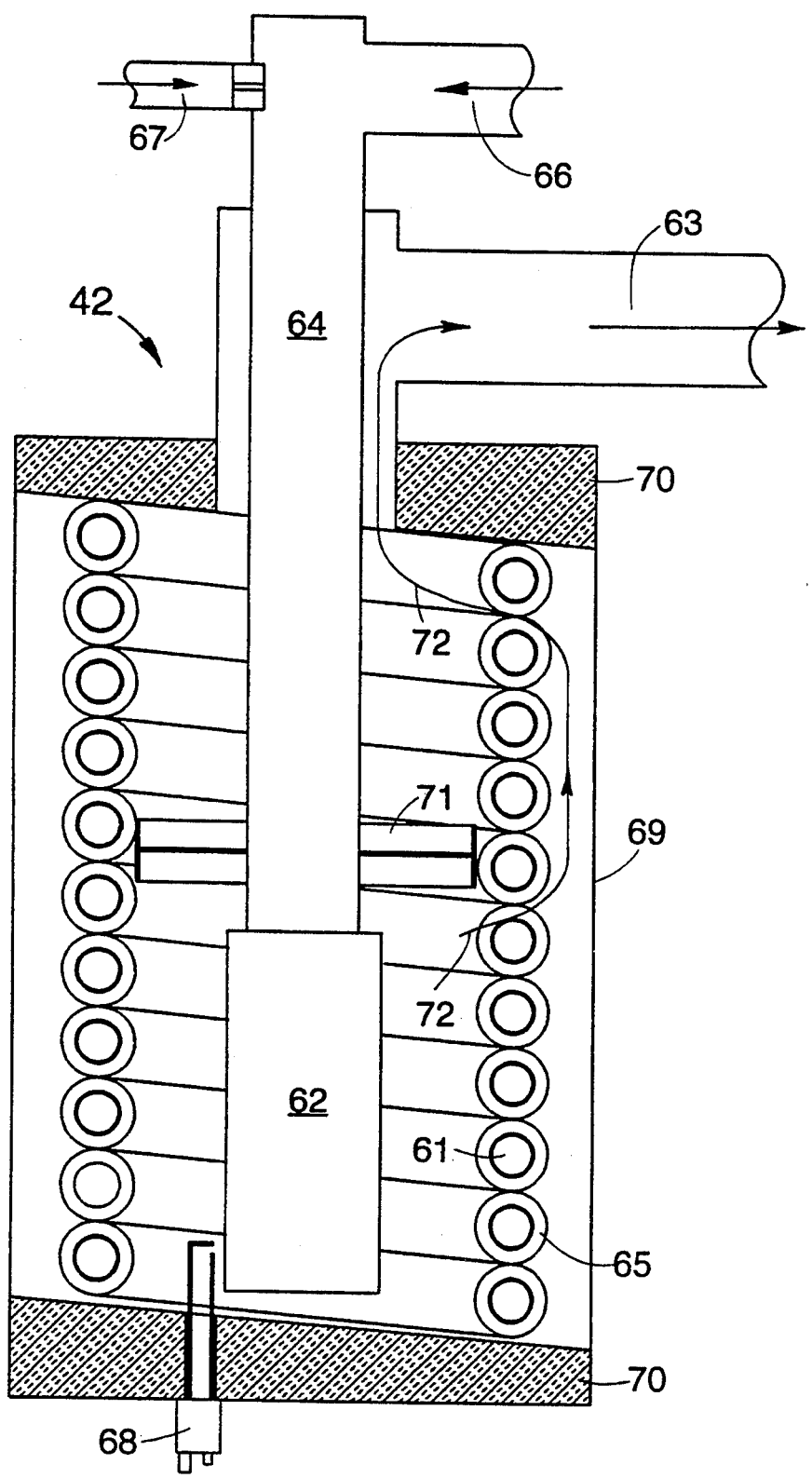
FIG. 9 is a schematic sectional view of a typical counterflow fluid heater incorporating preheating of the fuel-air mixture in cooking apparatus as in FIGS. 1–8.

The oil heater 42, shown in FIG. 9, consists of a coil of finned tubing 61 surrounding a cylindrical burner 62. The velocity in the coil 61 and the surface area of the fin 65 are balanced so that metal surface temperatures in contact with the oil 23 are limited to less than about 550° F. Typically the dimensions of the components of the oil heater 42 are approximately proportional to those in FIG. 9. The fins 65 are radial, about 0.03 inch thick, and evenly spaced at about ten per inch, along the tubing 61, where the outer diameter of the tubing 61 is about one inch. As shown in FIG. 9, the heater 42 is a two-pass, counter/crossflow design. Flue gases 63 exit over the coolest oil and surround the inlet air pipe 64, providing some air preheat. Flue gas 63 exits the rear of the griddle and can be attached to a direct vent or vented to a hood. High fin area and counterflow design allow flue gas temperatures to approach to within 100° F. of the entering oil temperature.

The coil 61 is positioned inside a housing 69 to collect and direct gases in an advantageous path 72. The cylindrical burner 62 is positioned coaxially with the coil 61 near one end. The air and gas supply to the burner 62 pass along the axis of the coil 61 and are bathed by the flue products leaving the system. A baffle 71 positioned on the air and gas supply pipe 64 forces gases from the burner 62 to flow through the fins 65 of the tube 61 as indicated at 72.

The burner 62 is a fully premixed, cylindrical, conventional perforated screen burner. A small forced draft fan draws air 66 from the oil system cavity. The fan discharge 66 is located directly opposite to the gas inlet 67; therefore gas/air mixing is readily achieved. The burner entrance tube provides additional opportunity for mixing. A spark ignitor 68 introduced from the end of the heater 42 ignites the burner 62 following a 15-second prepurge. The forced draft fan operates only during the prepurge and when the burner 62 is on to minimize heat loss during the off cycle. Because excess air is controlled, heater steady state efficiency exceeds 75 percent and the overall appliance efficiency is greater than 70 percent.

Advantages of this system include its compact design, simplicity of construction, high performance due to highly enhanced surfaces and control of gas flow, and preheating of the air and gas mixture to recover heat from the flue products and improve flame stability.

Upper Platen Positioning System

The second important aspect of the gas-fired, double-sided griddle is a means of conveniently positioning an upper cooking surface in contact with the product. Testing with a variety of schemes revealed that effectively searing the top side of a hamburger requires contact between the platen 43A, 43C, or 43E and the hamburger. Further, cooking speed is greatly enhanced by direct contact. However, excessive pressure on the hamburgers increases the tendency to stick and may crush the meat to a hard, unpalatable consistency.

Product uniformity objectives were realized by a counterbalanced, parallel motion positioning system 80. The upper platen positioning system 80 is shown schematically in FIGS. 1–7. The positioning system 80 allows two distinct motions by the platens 43A,C,E; pivoting about the point 81, and an up and down vertical motion via the rear linkage bar 82, with the platens 43A,C,E parallel to the lower cooking surfaces 43B,D,F.

The upper platens 43A,C,E are supported by a pivoting cantilever 83 that allows the upper platens to be raised to 60° above horizontal. Compression springs 84 inside the cantilever housing 85 counterbalance the weight of the upper platens 43A,C,E about the pivot point 81 so that a force of only about 10 pounds is required to close and latch the platens. A platen opens automatically when the latch 86 is released. The upper platens are positioned parallel to the lower platen by adjusting the latch position.

The entire cantilever 83, spring 84, and upper plate system is attached to a four-bar mechanism 82,87,88,89 at the back of the griddle that maintains the upper platens 43A,C,E parallel to the lower platens 43B,D,F. A manually or motor-actuated low-limit stop 91 adjusts the minimum gap between the upper and lower platens. The gap may be set at any position up to one inch. The low-limit stop 91 defines the final, minimum thickness of the product and is set to match the food product.

An auxiliary lifting device (manual or electrical) can raise the four-bar mechanism 82,87,88,89 to approximately 1⅛" above the lower platen surface. When the auxiliary lifter is lowered, the upper platen 43A will settle onto the lower stop 91 or the food, whichever is contacted first. The upper platen 43A is not lowered onto food until after it is latched; therefore warped frozen foods cannot prevent latching.

At the end of a cooking cycle, the latch 86 is released, the platens 43A,C,E tilt upward, and the four-bar mechanism 82,87,88,89 is driven to the full up position. After loading food on the griddle, the upper platens are manually latched and then automatically lowered. If the platens contact food (e.g., a warped frozen hamburger) before they settle to the lower stop, the weight of the platens rests on the food. A compression spring 92 on the pivot support 82 counterbalances the upper platen weight so that no more than 40 pounds of force is applied to the food. Experience has shown that this weight is acceptable for a group of five or more hamburgers. Forty pounds is acceptable for a single hamburger only if the lower stop 91 limits the travel to avoid crushing the hamburger. For a warped frozen food product, the initial contact coupled with a concentration of weight causes the offending item to thaw more rapidly and relieve the interference. Of course, all of the hamburgers (or other products) are the same thickness when finished since the upper platen is constrained to move parallel to the lower platen.

Figure 12:
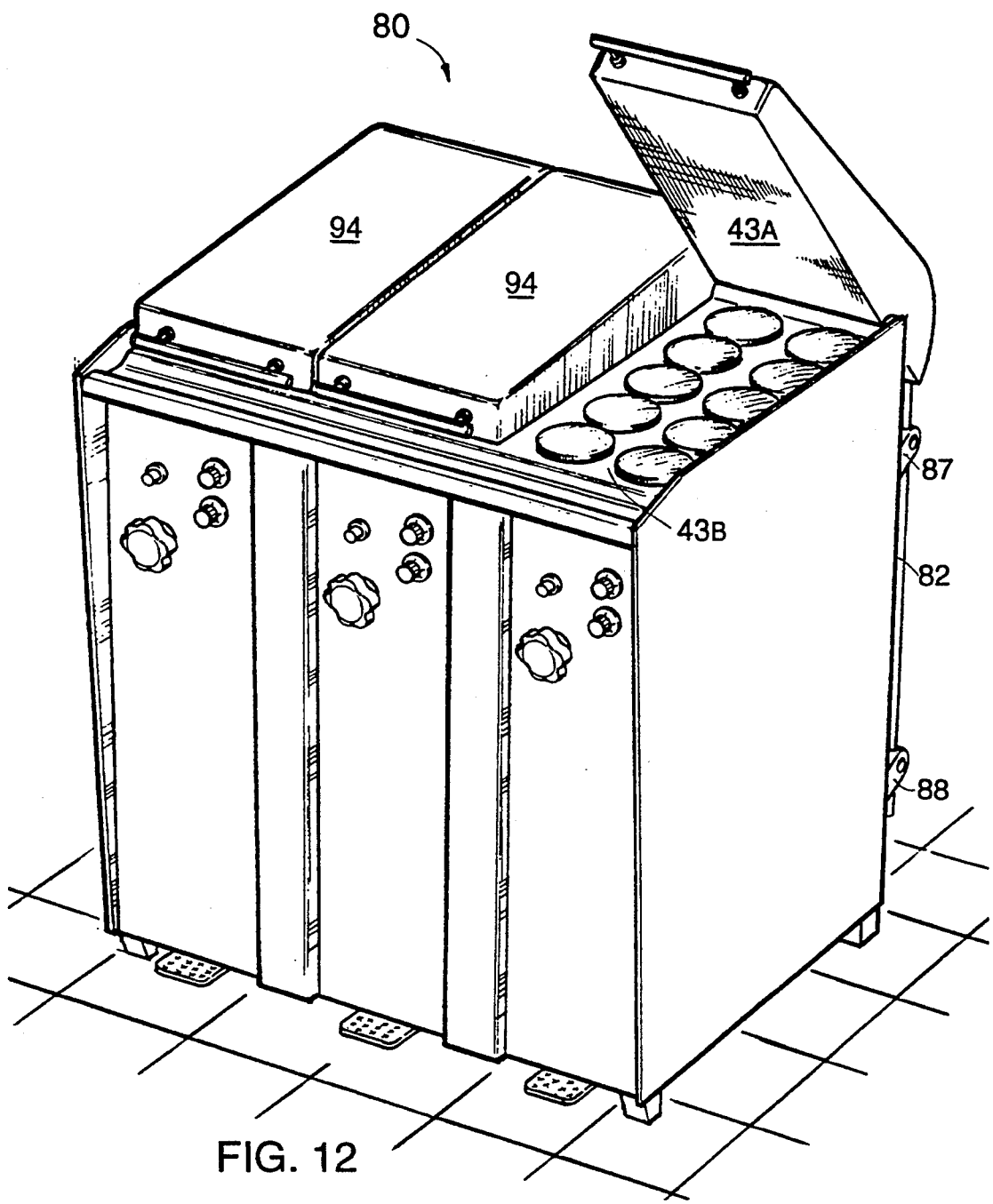
FIG. 12 is a perspective view of typical cooking apparatus according to the present invention with the right upper platen in the raised position.

FIG. 12 shows a prototype griddle with the right upper platen in its raised position. Unlike the currently available double-sided griddles, there are no knobs or cams on the upper platens; they have an aesthetically pleasing, uncluttered look. More importantly, the simple lines that result from the cantilever design improve cleanability.

Heat Exchanger

Each upper platen 43A,C,E is equipped with a removable shoe 111, shown in FIGS. 17 and 18, which is mechanically attached to the heat exchanger 110 of the upper oil transfer platen 43A,C,E. A layer of heat transfer grease improves contact between the shoe and the oil platen over their contiguous surfaces, as indicated 112 in FIG. 18. The shoe 111 may be coated with a highly durable non-stick coating, which is expected to exceed a six-month operational lifespan. Access to the mounting hardware is through the upper cantilever cover.

Griddle Performance

Griddle design and performance parameters are listed in Tables 1 and 2. Summarizing briefly, the griddle is over 70 percent efficient, uses less than 15,000 Btu/hr when idling at temperature (with upper platens lowered), and provides outstanding surface temperature uniformity and zone separation. The griddle can cook 720 quarter-pound hamburgers per hour.

Surface, Temperature, and Uniformity

Figure 10:
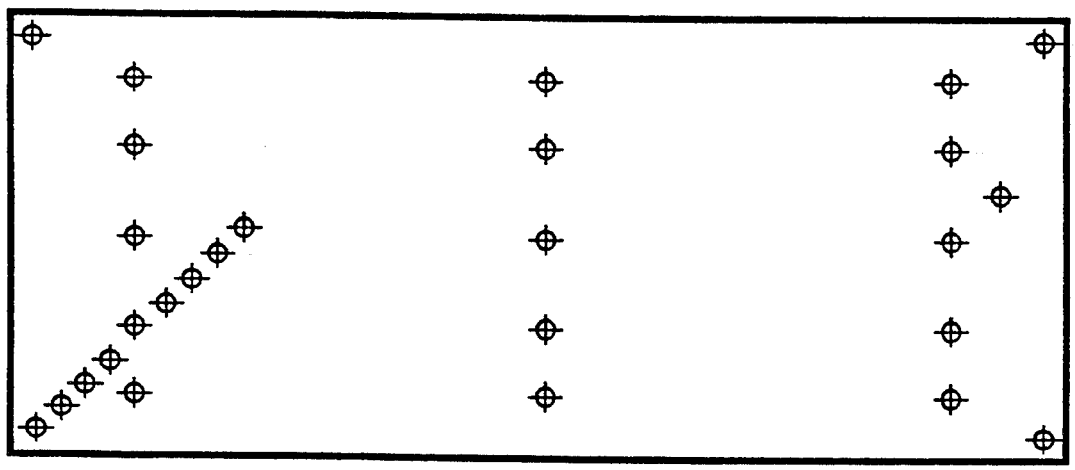
FIG. 10 is a schematic plan view of a heating platen showing the locations of thermocouples used in testing the uniformity of temperature therein.

FIG. 10, which is to scale, shows the positions of thermocouples welded on an upper platen during a temperature uniformity test. The platen is 28.5 inches long and 11.5 inches wide. Excluding the corners, the thermocouple temperature range (maximum minus minimum) was 5° at any specific time. Incorporating the 5° dead band in the controller, the temperature range during steady state operation is 10°.

Start-Up and Recovery

Figure 11:
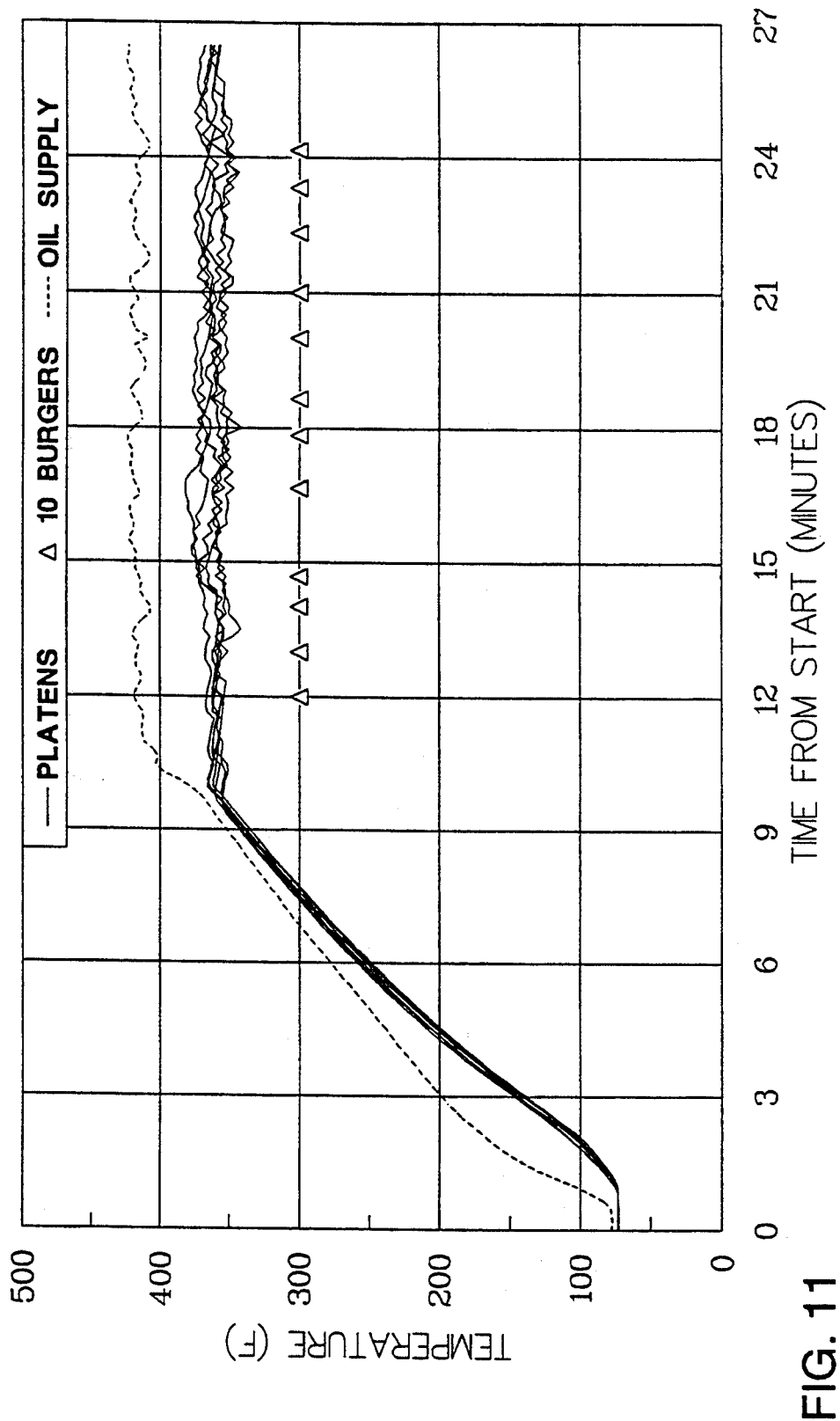
FIG. 11 is a graph of measured cooking surface and oil temperatures as functions of the time from starting to heat a griddle in the cooking apparatus.

FIG. 11 shows a temperature trace for the griddle as it warms from a cold condition to 360° F. Each diamond on the 300° line represents a load of ten hamburgers applied to a 12-inch wide section of the griddle. Hamburgers were loaded sequentially from the left section to the right. The griddle achieved cooking temperature in 12 minutes, and 120 hamburgers were cooked in 13 minutes. A skilled operator could have done better. As expected, temperature was less uniform during cooking than during testing because frozen hamburgers were placed on the griddle. However, there is no detectable temperature drop during cooking. A 30 degree sag did occur near the 27-minute mark when a soaking wet bath towel was placed on the griddle to begin cleaning.

Zone Separation

A pancake was placed to overlap two zones during cooking. The zone on the left was set for 265° F. and the zone on the right for 400° F. Two points were apparent from this qualitative test: zone separation is excellent since the 400° to 275° F. transition was observed to take place in less than one inch, and each section of the pancake was uniformly browned, showing local qualitative uniformity that confirms the quantitative data outlined above.

Cooking Performance

The griddle has been tested on hamburgers (double-sided), pancakes (double and single-sided), bacon (double-sided), and eggs (double and single-sided). Sunny side up eggs were prepared with the upper platen latched, but not touching the eggs. The result was a firmly cooked white and a warm, but uncooked, yolk. Performance was excellent on all foods tested. Upper to lower platen parallelism is crucial for double-sided cooking uniformity.

The gas-fired double-sided griddle meets or exceeds all of the engineering objectives required for a successful commercial appliance. Cooking performance appears to be better than in other known double-sided griddles. Surface temperature and zone separation are outstanding.

TABLE 1

DESIGN PARAMETERS

| Design Parameter | Goal | Status |
|---|---|---|
| Cooking surface size (in.) | 28½ × 36 | 28½ × 36 |
| Overall size | Not specified | 42½ × 36 |
| Weight | Not specified | ~950 lbs |
| Control range (F.) | 100–400 | 100–400 |
| Control differential | 3 F. | 2.5 F. |
| Controlled zones | 6 | 3 upper 3 lower |
| Venting | Not specified | Direct vent or to hood |

TABLE 2

PERFORMANCE PARAMETERS

| Performance Parameters | Goal | Status | Comments |
|---|---|---|---|
| Input (Btu/hr) | <160,000 | 150,000 | |
| Heat-up time (from cold start) | <17 min. | <14 min. | To 400 F., all platens |
| Efficiency | 70% | >70% | Water boil method, bottom platen only |
| Idling energy | Not specified | <15,000 Btu/hr | With covers closed, 375 F. set point on all platens |
| Total load/hr (¼ lbm burger) | 720 | 720 | 80% lean, 5¼ diameter |
| Response time | Not specified | <17 sec | Includes plate cool down from top of control range |
| Zone overshoot | +15 F. | <5 F. | For cooking temperature >300 F. |
| Surface temperature uniformity | ±10 F. over 80% of surface | ±5 F. over 90% of surface | Shoe/platen interface is crucial to surface temperature uniformity |
| Sticking to upper platen | Not sticking | Field replaceable non-stick shoe (6-month estimated life) | Non-stick material field tested on electric |
| Noise level | <65 dBa | <68 dBa at operator position | No sound absorbing material in place |
| Control ambient | <120 F. | ~120 F. | Microprocessor based controls, single board for all control functions |

The improved performance is attributable largely to the use of a hot oil system to transfer heat to the cooking surfaces and the incorporation of counterbalanced parallel motion linkages for the upper platens.

SUMMARY

The gas-fired, double-sided griddle system includes a lower cooking surface, at least one upper cooking surface, means for positioning the upper cooking surface, a circulating oil system, and other minor components necessary for control and safety. A novel feature of the griddle is the use of hot oil to transfer heat from a gas flame to the cooking surfaces. Further, the details of the oil system and the means by which heat is transferred from the oil to the cooking surface are particularly useful in achieving good cooking performance.

The circulating hot oil system coupled with the convoluted spiral heat exchanger/platen design (FIG. 16) enables very uniform cooking surface temperature, a low mass platen (therefore quick response) and excellent separation between cooking zones on the lower surface. These features depend on having a supply of oil that is hot and available for circulation to the platen at any time.

The weight controlled valve 10 and continuously recirculating oil loop 41-49 in FIG. 8 provide a constant pressure differential between the supply and return manifolds 46,48 and insure that hot oil 23 is always available in the supply manifold 46. Thus control of cooking surface temperature is achieved by the simple expedient of turning on or off a valve 49 to allow or stop the flow of oil to the platen 43. The control valve 49 for each platen 43 is beneficially located downstream of the platen 43 where oil temperatures have been cooled and are therefore less severe on the valve 49.

Another function of the weight controlled valve 10 is to insure that there is always full oil flow through the oil heater 42. If sufficient oil flow always exists through the oil heater 42, then the temperature of the oil can be controlled by simply turning on the burner 62 in response to a low temperature. If full oil flow is not assured at all times, the burner 62 must be modulated or interlocked with oil flow to prevent overheating the oil. Further, if the burner firing rate must be keyed to the oil flow, there is an inherent time delay between the time that heat is required by one cooking surface (platen) and the time that the burner 62 and oil heater 42 can provide that heat.

With a fully recirculated system 40 such as is used on the griddle, all of the oil 23 is maintained at a minimum temperature at all times. The thermal mass of the heated oil 23 in the recirculation loop 41-49 provides the capacity to respond to heavy loads that is usually accomplished by a heavy griddle platen. Thus, the recirculating oil loop 41-49, deadweight valve 10 and burner 62 cooperate with the requirements of the cooking surfaces to provide a benefit not obtainable with other oil system arrangements.

The use of a circulating hot oil 23 is particularly beneficial for transferring heat to the upper, movable platens 43A,C,E. Other methods that have been tried include electric resistance heaters, infrared burners facing down, and vapor energy transport (e.g., Sotani et al., U.S. Pat. No. 4,955,361).

These methods and apparatus are more complex than the present circulating oil system 40. The cost of electric resistance heat energy is high. The use of infrared heaters facing downward has disadvantages: If used directly, no contact with the meat for surface searing is possible. If a heated metal platen is placed below the burners, a surface searing can be achieved, but temperature control is very difficult because portions of the surface not in contact with a food product will overheat while surfaces in contact with the food may be too cool. In either case, the efficiency is low because the burners cannot emit more than perhaps half of the higher heating value of the fuel as radiant energy.

The use of vapor energy transport is potentially comparable in performance to circulating oil; but temperature control is achieved by changing vapor pressure in the system which requires longer times to accomplish than the on/off valve control available with the circulating oil system.

The four-bar mechanism 82,87,88,89 in FIGS. 2-7 provides a simple, uncluttered arrangement for positioning the upper cooking surfaces 43A,C,E that is superior to other techniques that depend on stops that rest on the griddle. An important benefit to this arrangement is that it permits automation of the upper griddle position by use of relatively conventional hardware. Because a single lift point is sufficient, as opposed to three or four in other known equipment, and is independent of the griddle surface, a small gear motor may be used to position the stop 91 for the lower griddle position in FIG. 6 and may also be used to lift the griddle substantially above the food for non-contact cooking if desired.

The uniform surface temperature is primarily a result of the method of circulating oil 23 in the convoluted spiral pattern heat exchanger 110 of FIGS. 16-18. The convoluted heat transfer channel 112 allows platen surface temperatures of about ±5° F. to be achieved even though the oil changes temperature by as much as 40° F. as it flows through the platen.

In addition to the convoluted spiral 112, a typical design includes an engineered balance between the mass of steel in the platen 43 and the total mass of oil 23 contained within the platen. This is coupled with the use of a low temperature difference, high convection coefficient configuration for the platens. In other words, the flow passage 112 is designed to have a high oil velocity but a minimum of contained oil 23 so that when oil flow is stopped the surface temperature does not rise excessively due to the energy in the oil 23.

The high velocity permits sufficient heat transfer without requiring a high oil temperature, which also limits the maximum rise in platen temperature when oil flow is stopped. The inlet oil temperature need only be about 40° F. above the platen temperature to achieve adequate heat transfer. For practical control it is convenient to have the entering oil 23 at about 420° to 450° F. for cooking at temperatures up to about 400° F. A beneficial modification is to have the maximum oil temperature adjusted to about 45° F. over the hottest platen setpoint. This is possible using a simple integrated electronic control system.

Another attribute designed into the griddle to achieve uniform surface temperature is a minimum conduction path between sections and between the edge sections and the griddle frame and splash guard. A thin griddle plate 111 minimizes crosstalk between sections; but may not even out the temperature between the channels on the platens for the same reason, a minimum conduction path. Eight channels per platen, as in FIG. 16, coupled with a 3/16" griddle plate seems to provide a good balance between these two competing requirements and provide sufficient strength as well.

As discussed above, the oil temperature is only slightly higher than the platen temperature. If one or two hamburgers are cooked on the front of a platen, the heat load in that area requires that heat be supplied to the platen. For electric or conventional gas, this can result in severe overheating of the unused portions of the griddle because heat is added to those areas even when it is not needed. Since the maximum oil temperature is about 450° F., the maximum temperature to which unheated portions of the griddle can be heated is about 450° F., which is not unnecessarily hazardous to personnel, food products, or surface coatings. The surface temperature uniformity design aspect also relates to this attribute.

Cooking zone separation is related to the conduction path between zones as discussed above. Zone separation is an important attribute for griddle flexibility and the level of zone separation we have achieved has been impressive to people in the food service industry.

The griddle should warm up from cold rapidly, should recognize the presence of a frozen hamburger quickly, should avoid a sag in temperature with a heavy food cooking load, and should recover from a heavy load as soon as possible without overshooting the set temperature. The circulating hot oil system of FIG. 8 is particularly good at quick recovery and minimizing sag, because we maintain a constantly circulating reserve of hot oil which can be introduced to the platen quickly. Further, the thin griddle plate permits sensing temperature only slightly below the surface so that the presence of food is detected early. Finally, the low mass of steel in the system allows the griddle to heat up from cold rapidly. It also permits a cooldown on change to a lower setpoint temperature more rapidly than with other griddles.

Because the combustion process is isolated from the heating surfaces by the hot oil, it is possible to design a high efficiency heater specifically for the oil. The heater design includes a relatively high oil velocity to minimize surface temperatures and maximize oil life, a high gas side surface area to extract energy from the combustion products and, in our design, some preheating of the incoming air to conserve energy and improve efficiency. The burner is a fully premixed power burner that is well matched to the heater coiled tubing. While we have not measured NOx from the prototype griddles, similar configurations using premixed burners and rapid flue gas temperature quench by finned tubes achieve less than 30 ppm NOx as compared to 60 to 100 for a conventional griddle.

Positioning Mechanism

To griddle hamburgers or other food from both sides simultaneously, it is desirable, though not necessary, to contact both sides of the product with a heated surface. The present invention accomplishes this while controlling the force applied to the product, as well as providing an adjustable stop to prevent crushing delicate food items.

The positioning apparatus 80 is shown schematically in FIGS. 1–7. A heated upper platen 43A is suspended from a combined housing and support 94 having a pivot point 81 near the rear of the platen. The platen 43A typically may rotate about the pivot point 81 through an angle of about 60 to 80 degrees, allowing the platen to be positioned parallel to the lower griddle platen 43B for cooking and raised to nearly perpendicular to the lower griddle for loading and unloading and when not in use. The pivot is mounted on a movable assembly 82,87,88 as shown which permits the upper platen 43A to move up and down parallel to the lower platen 43B. The distance between the upper and lower platens is limited by a stop 91 which stops upper platen downward travel.

Figure 3:
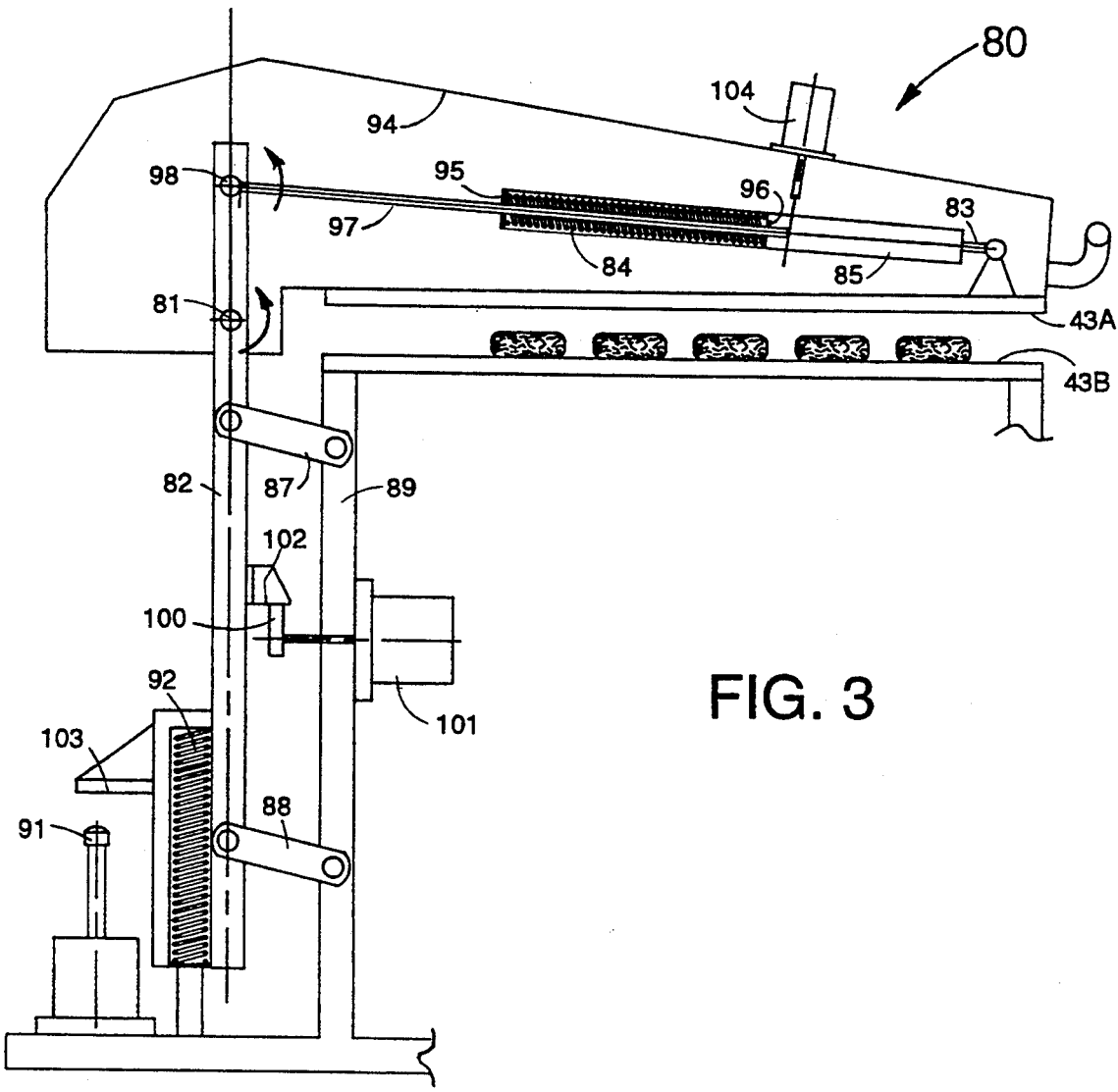

A spring 84 counterbalances the upper platen 43A so that it will remain in the up position, as in FIG. 3, until it is pulled down. The spring 84 also raises the platen 43A at the end of the cooking cycle.

The spring 84 is in compression between the left end 95 of the cantilever housing 85 and the right end 96 of the rod 97, which is connected pivotally at 98 to the vertically movable bar 82. So the spring 84 urges the cantilever housing 85 to the left and, when not prevented by the latch 86, pulls the right end 83 of the cantilever 85 to the left; and thus swings the housing 94, and everything in or attached to it, upward about the lower pivot point 81. Alternatively, the same function might be provided, but less safely, by a spring connected in tension between the upper pivot point 98 and the right end 83 of the cantilever housing 85.

Another spring 92, located at the rear of the movable assembly, counterbalances the weight of the platen and positioning assembly to control the force placed on the food product.

This positioning apparatus has several advantages. Other similar griddles use three or four positioning devices, which support the upper platen directly from the lower. These devices interfere with the cooking surface and catch grease. The present device uses a single positioning stop which is away from the cooking surface and is easily automated.

The force applied to the food product can be controlled. This permits a lighter contact with the food product, as desired. With other devices, the full weight of the upper platen rests on the food until relieved by the stops.

The mechanism is extremely robust, and due to its simplicity, inexpensive.

The absence of adjusting knobs on the upper platen improves visual appeal and eliminates cleaning difficulties.

Figure 1:
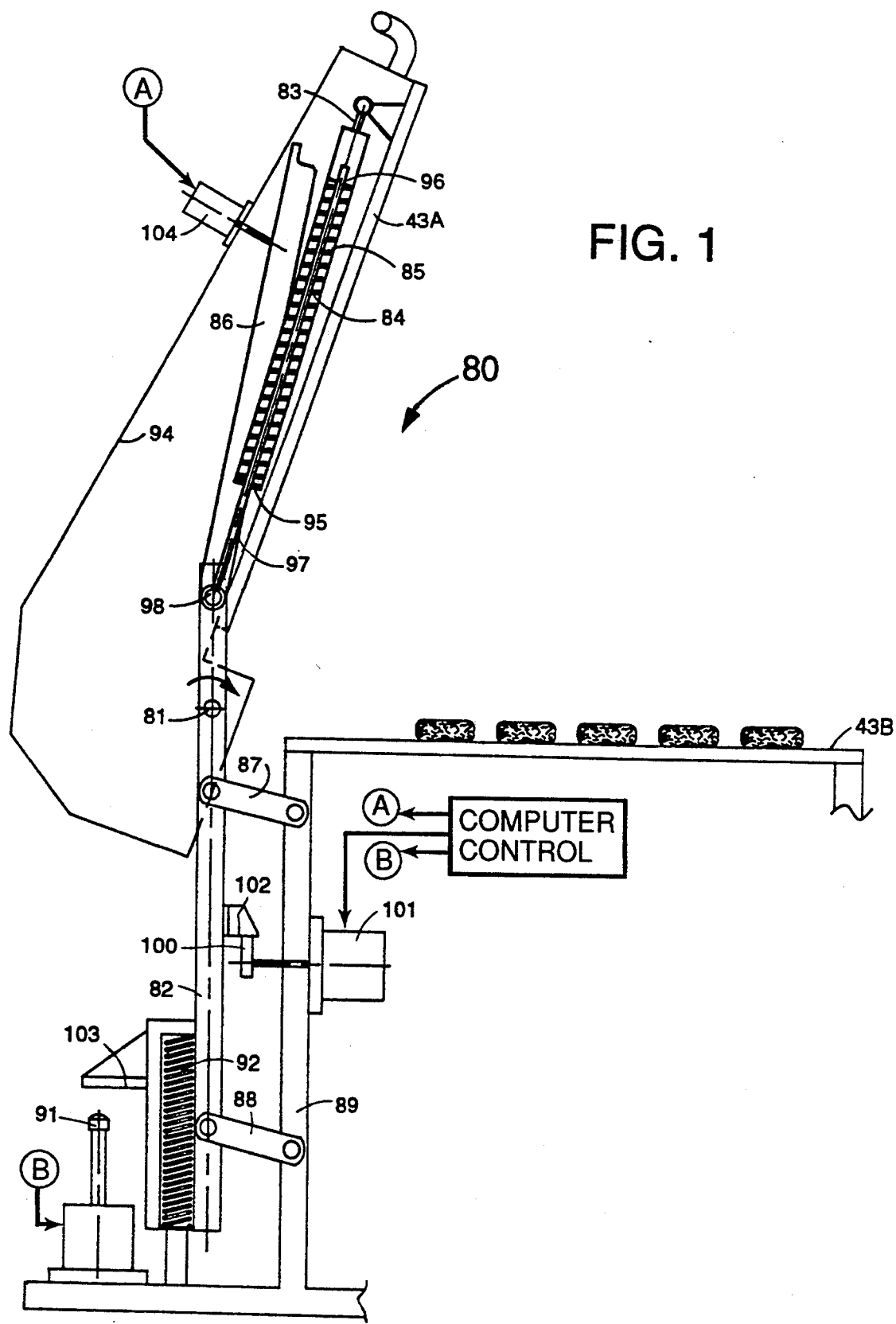
FIGS. 1–7 are schematic sectional views of typical cooking apparatus according to the present invention. These figures show the apparatus in various stages of a typical cooking sequence.
Figure 2:
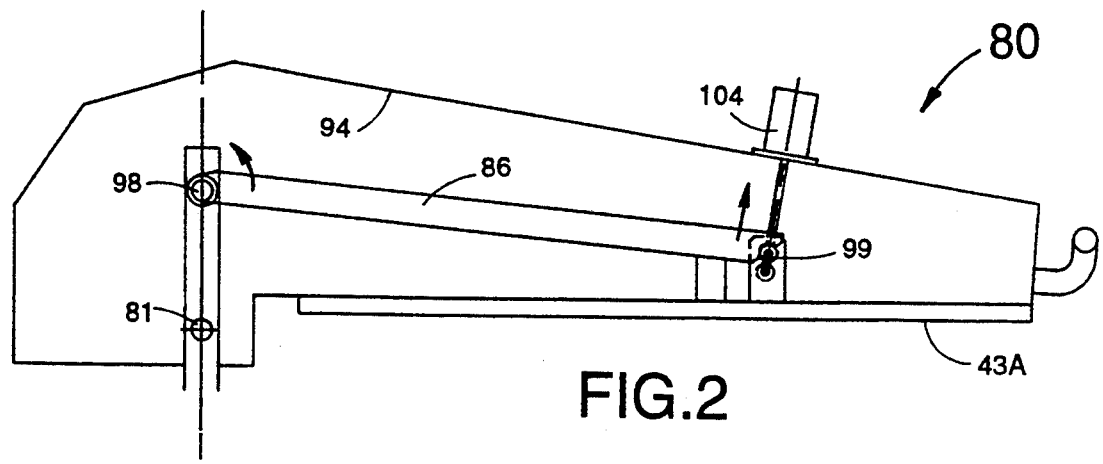

A typical cooking cycle proceeds as follows:

With food loaded on the lower platen, the operator closes the upper platen 43A, either manually or by turning on partly or fully automated activating equipment, down from the nearly vertical position of FIG. 1 to the horizontal position of FIGS. 2 and 3.

The latch bar 86 drops into place, resting on the stop 99 (as shown in FIG. 2) and thus locking the upper platen assembly 94 into the horizontal position, parallel with the lower platen 43B.

The upper platen 43A is not in contact with the food, because the supporting mechanism 94 etc. is held up at the bar (82) lifting surface 102 (Cam plate) by the raise/lower cam 100 (FIG. 3).

Figure 4:
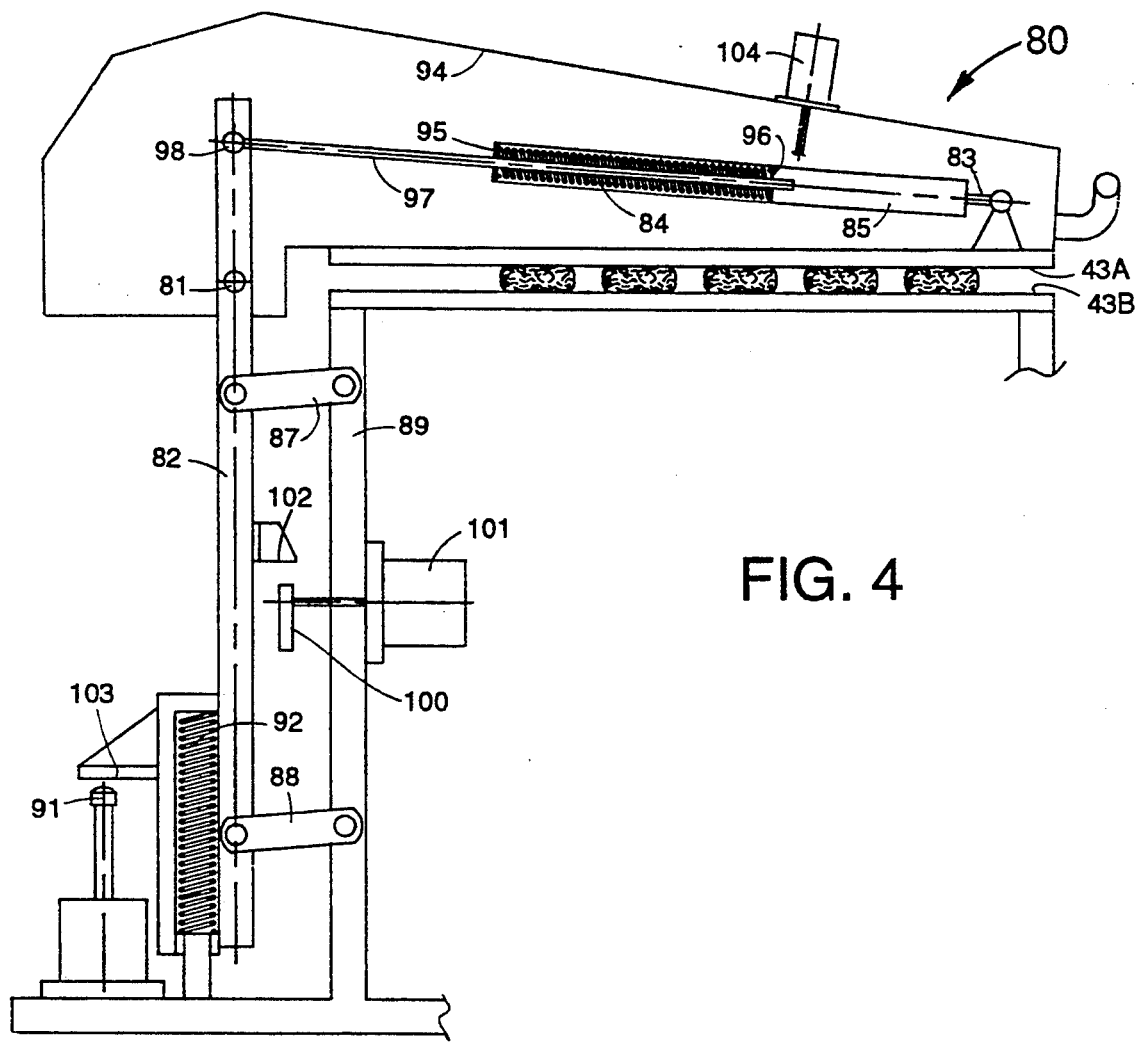

The cam motor 101 activates, rotating the cam 100 downward to lower the platen 43A onto the food (FIG. 4).

Figure 5:
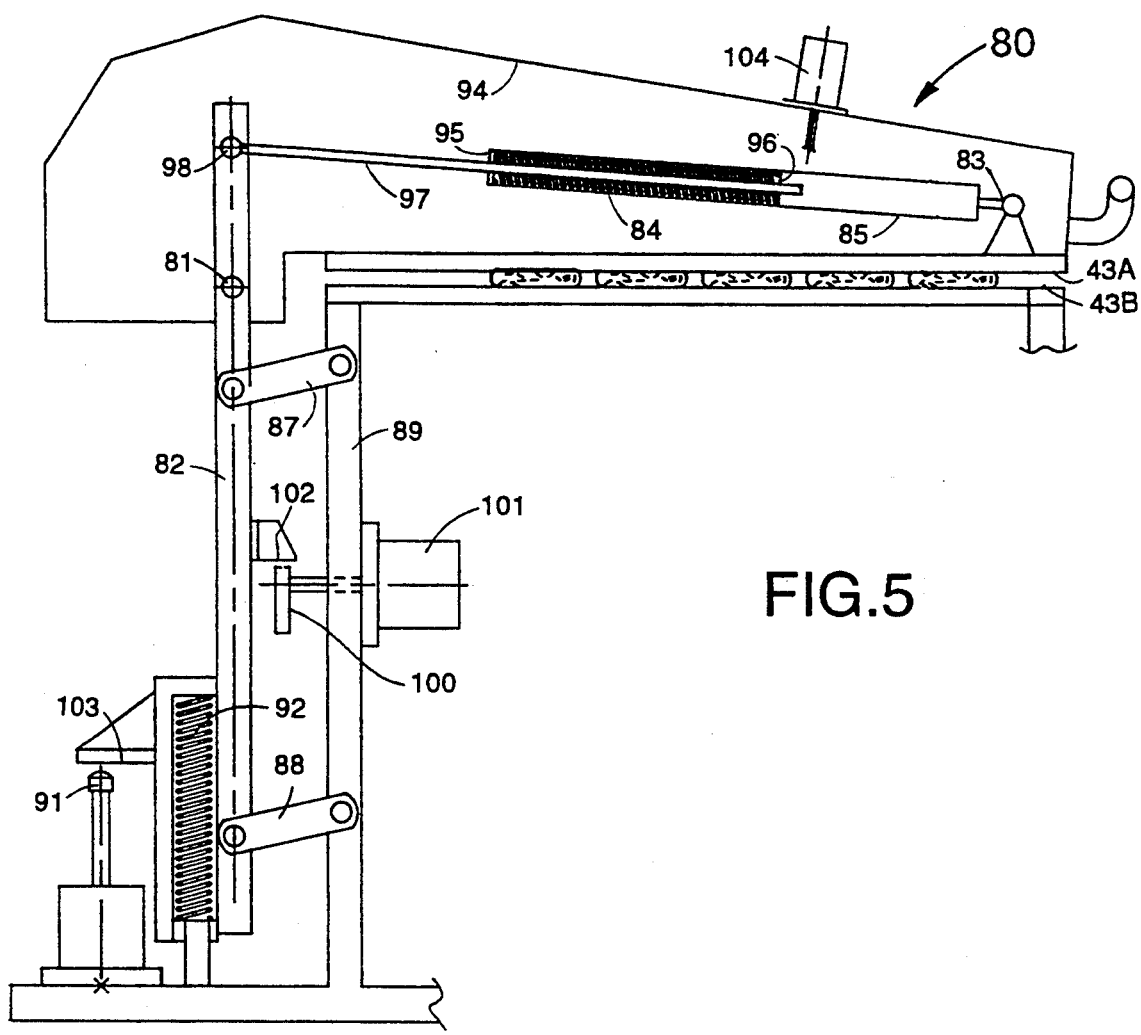

The uncounterbalanced net weight of the upper platen assembly 43A, 94 etc. bears on the food, maintaining intimate contact for fast cooking. As the food shrinks, the platen 43A moves downward until the limit plate 103 makes contact with the adjustable stop 91 under the four-bar linkage 82,87,88,89, as shown in FIG. 5. The stop 91 is motorized and is set by the griddle computer according to the type of food being cooked.

Figure 6:
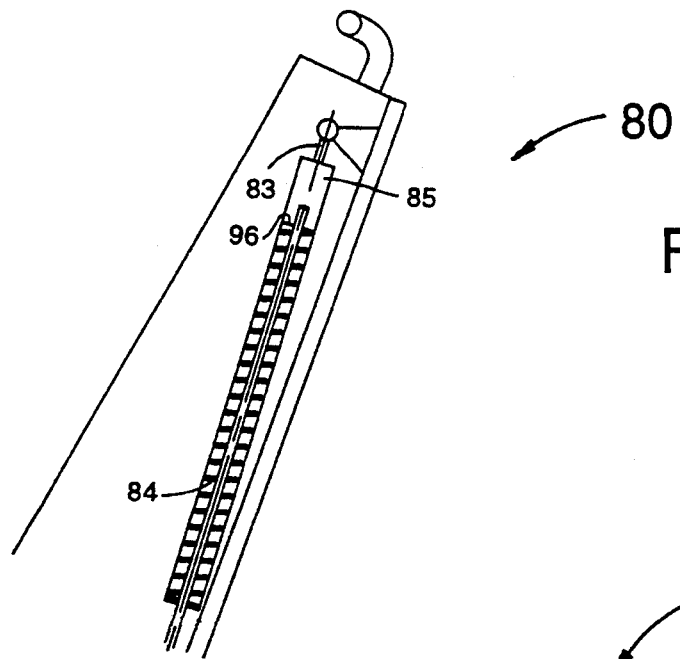
Figure 7:
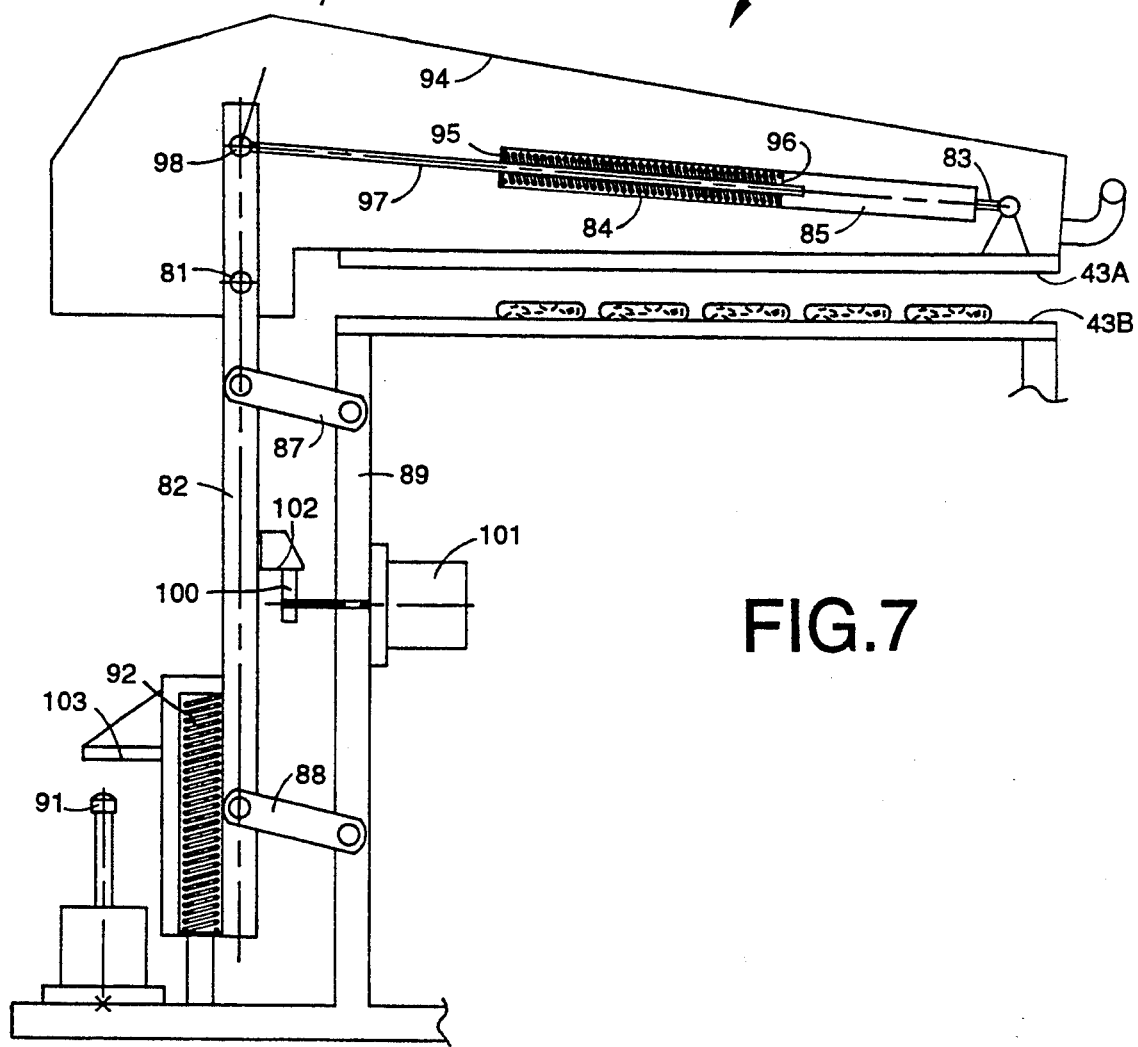

Cooking proceeds for a timed interval set by the electronic computer. At the end of the cycle, the cam motor 101 activates, rotating the cam 100 upward against the cam plate 102, lifting the upper platen 43A vertically away from contact with the food, as shown in FIG. 7, and the latch solenoid 104 activates, pulling the latch 86 upward away from the stop 99 and thus releasing the upper platen assembly 43A,94 and allowing it to return to its tilted position under the influence of the lifting spring 84 (FIG. 6 and FIG. 1).

Bearing on the food with the uncounterbalanced portion of the platen weight cooks food at a higher speed.

The heated platens 43A, 43B stay parallel during cooking, so that all food pieces of a particular load are cooked to a final thickness that is the same.

The limit stop 91 prevents the weight from crushing the food when cooking a single piece or any soft food, such as pancakes.

The limit stop 91 for each upper platen 43A,C,E has a simple adjustment at a single point.

The single point adjustment is easily motorized, so that food settings can be performed under computer control.

Each upper platen of a multi-zone griddle has an independent adjustment, so that different foods can be cooked simultaneously.

The lift cam 100 relieves the weight load on the adjuster, so that it can be moved easily by hand or by a small motor.

The four-bar mechanism 82,87,88,89 is compatible with wide bearing spans, a robust feature that insures that the platen does not vibrate excessively or move out of position under load.

Position Mechanism Summary

To summarize in the format and terminology of the claims, typical apparatus according to the present invention, for positioning in a predetermined sequence before, during, and after cooking, the upper cooking surface in a double-sided griddle having a lower platen providing a horizontal lower cooking surface and an upper platen providing an upper cooking surface, comprises means for moving the upper platen 43A into a horizontal position in contact with the food; means for permitting the upper platen 43A to press downward against the food until the cooking surface reaches a predetermined level above the cooking surface of the lower platen 43B; means for stopping the downward movement at that level; and means for lifting the upper platen 43A away from the food after a predetermined cooking time.

Typically, a heated upper platen 43A is suspended from a combined housing and support 94 having, near the rear of the platen, a pivot point 81, about which the platen 43A may rotate through an angle of at least about 60 degrees, allowing the platen to be positioned parallel to the lower griddle platen 43B for cooking and raised to a nearly vertical position for loading and unloading and when not in use.

The pivot 81 typically is mounted on a vertically movable assembly 82,87,88 that permits the upper platen 43A to move up and down parallel to the lower platen 43B; and the distance between the upper and lower platens is limited by a limiting stop 91 for stopping the downward travel of the upper platen 43A.

The apparatus typically comprises also a counterbalancing spring 84 for raising the upper platen 43A at the end of each cooking cycle, and holding it in its nearly vertical position until it is pulled down, as well as the following components, wherein the spring 84 is held in compression between a first end 95 of a cantilever housing 85 and the opposite end 96 of a rod 97, which is connected pivotably at an upper pivot point 98 on the vertically movable bar 82, so that the spring 84 urges the cantilever housing 85 toward its first end 95 and, when not prevented by a latch 86, pulls the opposite end 83 of the cantilever housing 85 in the direction toward its first end 95; and thus swings the housing and support 94, together with everything in or attached to it, upward about a lower pivot point 81 on the vertically movable bar 82.

The spring 84 and cantilever 83,85 can be located either inside the upper platen mechanism as shown in the drawings or in any other convenient place, such as at the rear of the griddle, where it can urge the upper platen 43A in the counterclockwise direction about the upper pivot point 98.

The latch bar 86, the stop 99, and the solenoid 104 preferably are located as shown in FIGS. 1 and 2. Alternatively, they could be located in another convenient and equivalent arrangement elsewhere.

Typically the apparatus includes a spring 92, located at the rear of the movable assembly 82,87,88, for counterbalancing the weight of the platen and positioning assembly to control the force placed on the food between the lower platen 43B and the upper platen 43A.

The vertically movable assembly 82,87,88 typically comprises a first elongate vertical bar 82, a first substantially shorter approximately horizontal bar 87, pivotably connected at one end to a point near the upper end of the first vertical bar 82, a second similar approximately horizontal bar 88 pivotably connected at one end to a point near the lower end of the first vertical bar 82; and a second elongate vertical bar 89, held fixedly at its lower end and at its upper end fixedly supporting the lower platen 43B, is pivotably connected near its upper end with the other end of the first shorter bar 87, and is pivotably connected near its lower end with the other end with the second shorter bar 88; whereby the four bars 82,87,88,89 together form a vertically long and horizontally short parallelogram (rectangle when the shorter bars 87,88 are horizontal) in which the first elongate vertical bar 82 can move a substantial distance in the vertical direction, when so activated, with only negligible concomitant horizontal movement.

A typical method of operating such apparatus having the following components, comprises the steps A. with food loaded on the lower platen, the operator closes the upper platen 43A, either manually or by turning on partly or fully automated activating equipment, down from a nearly vertical position (as in FIG. 1) to a horizontal position (as in FIG. 3);

B. a latch bar 86 drops into place resting on a latch stop 99 (as shown in FIG. 2) that locks the upper platen assembly 94 into the horizontal position parallel with the lower platen 43B;

C. the upper platen 43A being away from contact with the food to be cooked, because the supporting mechanism 94, etc. is held up by a cam 100 at a cam plate 102 (FIG. 3);

D. a cam motor 101 activates, rotating the cam 100 downward to lower the upper platen 43A onto the food (FIG. 4);

E. the uncounterbalanced net weight of the upper platen assembly 43A,94 etc. bears on the food, maintaining intimate contact for fast cooking, while, as the food shrinks, the upper platen 43A moves downward until a limit plate 103 makes contact with an adjustable limiting stop 91 under a four-bar linkage 82,87,88,89 (as shown in FIG. 3);

F. cooking proceeds for a predetermined interval set by an electronic computer; and G. at the end of the cycle, the cam motor 101 activates, rotating the cam 100 upward against the cam plate 102, lifting the upper platen 43A vertically away from contact with the food (as shown in FIG. 7), and a latch solenoid 104 activates, pulling the latch 86 upward away from the latch stop 99 and thus releasing the upper platen assembly 43A,94 and allowing it to return to its tilted position under the influence of a lifting spring 84 FIGS. 6 and 1 FIG. 7, upper exploded portion, and FIG. 3.

Typically, the limiting stop 91 is motorized and its position is set by a computer according to the type of food being cooked.

The heated platens 43A,43B stay parallel during cooking, so that all food pieces of a particular load are cooked to the same final thickness. The limiting stop 91 prevents the weight of the upper platen assembly from crushing the food when cooking a single piece of food, or any amount of soft food, such as pancakes.

Typically, the position of the limiting stop 91 for each upper platen 43A,C,E is controlled by a simple adjustment at a single point; and the adjustment is motorized, so that limit settings can be performed under computer control. Typically, each upper platen of a multi-zone griddle has an independent adjustment, so that different foods can be cooked simultaneously. The cam 100 relieves the weight load on the means for adjusting the limiting stop 91, so that it can be moved easily by hand or by a small motor.

Weight Controlled Valve

Referring now to FIGS. 13, 14, and 15, a typical pressure regulating valve 10 according to the present invention, adapted for mounting and operation in a predetermined fixed attitude, comprises a housing 11 having an inlet port 12 and an outlet port 13; and a straight elongate tube 14 so affixed to the housing as to be positioned vertically when the valve 10 is mounted in the fixed attitude for operation, and having an opening 15 at its lower end communicating with the inlet port.

A piston 16 having a solid horizontal lower end 17 extends down into the tube 14 from the open upper end 18 of the tube 14, and closely but slidably fits therein. A substantially lengthwise aperture 19 in the tube 14, extends upward from a level 20 near the lower end of the tube 14 to a level substantially below the upper end 18 of the tube. The piston 16 is slidable between a lower position, as in FIG. 13, with its lower end 17 below the lower end 20 of the aperture 19 and an upper position, as in FIG. 14, with its lower end 17 substantially above the lower end 20 of the aperture 19.

A weight 22 in, and spaced from, the housing 11, is positioned to exert a downward force on the piston 16 by virtue of the gravitational attraction of the weight 22 to the earth; such that, when fluid 23 is supplied under pressure to the inlet port 12, the fluid 23 presses upward against the lower end 17 of the piston 16, the weight 22 presses downward against the piston 16; and when the lower end 17 of the piston 16 is at a level between the ends 20, 21 of the aperture 19 the fluid 23 flows in from the inlet port 12, through the open portion of the aperture 19, into the other space in the housing 11, and out through the outlet port 13, at a substantially constant predetermined pressure that is directly proportional to the combined mass of the piston 16 and the weight 22.

The weight 22 is typically positioned to press against the upper end 24 of the piston 16, and preferably is affixed to the piston 16 as indicated at 25.

Typically the weight 22 comprises predominantly an annular body surrounding, and coaxial with, upper portions of the piston 16 and the tube 14; and the piston 16 preferably extends down at least to the level of the lower end 26 of the annular body 22 (and typically farther down, as in FIGS. 13 and 14).

The valve 10 typically comprises also a surface 27 in the housing 11 that prevents upward movement of the weight 22 and the piston 16 beyond a predetermined stable upper position (as in FIG. 14), and another surface 28 in the housing 11 that prevents downward movement of the weight 22 and piston 16 beyond a lower position (as in FIG. 13) where the lower end 17 of the piston 16 is at a predetermined level 29 below the lower end 20 of the aperture 19, and where the weight 22 and the piston 16 are away from any contact with the upper end 18 of the tube 14.

The predetermined level 29 below the lower end 20 of the aperture 19 is such that upward movement of the piston 16 from there to the level at which the lower end 17 of the piston 16 is just above the lower end 20 of the aperture 19 is sufficient to be readily detectable by inexpensive sensing means, while small enough to provide response that is fast enough to minimize any momentary deviation from constant pressure in a fluid system controlled by the valve 10. Convenient sensing means typically comprises a magnetic member 31 connected to move with the piston 16, and means 32 for providing a signal responsive to the position of the magnetic member 31. The signal providing means typically comprises a magnetically actuated switch 32.

Depending largely on where the valve 10 is to be mounted, the inlet port 12 may be located on a vertical surface of the housing 11 (as in FIG. 13), or it may comprise an extension of the vertical tube 14 through the bottom of the housing 11 (as in FIG. 14).

The valve 10 is especially advantageous for operation with a liquid. Preferably the liquid 23 substantially fills the housing 11 and thus damps the movement of the moving parts therein. The liquid typically consists essentially of oil.

A relatively large motion of the piston is required for a small change in the open area of the slot, so valve motion is damped by the friction of the piston on the tube and by the flow of oil around the weight, which should be submerged in the oil. Unlike most valves disclosed in the literature, this valve does not need a separate damper, and a close tolerance fit between the piston and the tube is not required.

The valve is optimally arranged to provide a dead zone below the slot as shown. This allows particles which are swept along by high oil velocities to settle out and be trapped in the bottom of the valve, since velocities outside the slot may be relatively low and particles may be trapped by the impact of the slot jet against the side of the valve.

If the slot is located too near the bottom of the valve, particles might remain entrained with the oil.

The valve is useful in any oil system requiring controlled pressure over a wide variation in oil flow conditions and where it can be maintained in an upright position. It is especially advantageous in hot oil commercial cooking systems such as the present high-volume system since it is more reliable and less expensive than spring relief or active control relief valves.

Circulating oil systems, particularly those which supply oil to intermittent use devices require a means of regulating oil pressure supply to the devices. This is particularly true when several intermittent devices are operated in parallel. The valve of this invention can regulate the supply pressure over a very large range of flow rates, and can serve as both a pressure control device and as a reservoir for oil storage.

The valve may be employed in a manner as shown in FIG. 8, which is a schematic diagram of a hot oil system 40. Discharge from a pump 41 is directed through the oil heater 42 and from there to the base 12 of the valve 10 as well as to the various oil heated devices 43A–43F. Oil from the various devices returns to the pump suction 47, as does the outlet 13 from the valve 10. The upper portion of the valve 10 serves as an expansion reservoir connected with the pump suction 47. Depending on system and valve capacities, a supplemental expansion tank 44 may be desired to accommodate expansion of oil during heating.

When all of the devices 43 are in operation, oil flows primarily to them and the valve 10 typically is positioned near the lower end of the travel, with its exact position determined by the excess capacity of the pump 41. As devices 43 are closed, there is less demand for oil and the flow through the valve 10 increases. Because the pressure at the base of the valve 10 is controlled by the weight 22 on the piston 16, the effect is for the slot 19 to open further, not for the pressure to increase. This insures that there is no surge of oil to any active devices and that oil flow through any one device is independent of the oil flow in the other devices, so long as line pressure losses are negligible.

The present valve is ideal for small oil systems such as those used for cooking appliances. The low cost, low occupied volume, low surface area features are particularly important for compact, high efficiency appliances.

The valve can maintain approximately constant pressure drop over a wide range of flows. This is different from other somewhat similar devices, which provide nearly constant pressure over only a small range of flow rates.

A particular pattern of fluid flow through a heat exchanger has been found beneficial in achieving very uniform surface temperatures on the heat exchanger. Possible uses for this device include cooking, especially of temperature sensitive foods, preparation of chemical compounds and polymers sensitive to temperature variations and possible the growing of crystals under controlled conditions. The reader will, no doubt, discover other applications requiring a particularly uniform heat exchanger surface.

In a typical heat exchanger, fluid at a temperature presumably greater than that desired for the heat exchanger surface is brought into the heat exchanger, passes through some path provided in the exchanger and transfers heat to the exchanger and to any loads in contact with the heat exchanger. As heat is transferred from the fluid, its temperature drops so that as the fluid leaves the exchanger its temperature may be many degrees different than when it entered. In all heat exchangers with which we are familiar, this causes a change in the temperature of the heat exchanger from inlet to outlet. Some prior art has addressed the issue of uniform heat exchanger temperature, for example, Friedman, et al. U.S. Pat. No. 4,478,227, issued Oct. 23, 1984, for Heat Exchanger Having Uniform Surface Temperature and Improved Structural Strength. We believe the current device is superior because of better local uniformity than the prior art and better control of the edge heat losses. The success of the heat exchanger is dependent on a slightly modified convoluted spiral pattern for the fluid flow path. The path is shown schematically in FIG. 16. If the rectangular shape is mentally adjusted to a roughly circular configuration, it becomes obvious that there are two parallel spirals, one traversing in from the outside toward the center and adjoining a second that traverses from inside to out. Provisions are made for connections at the end of the spirals.

FIG. 16 shows the direction of fluid flow in each channel. It is readily seen that fluid flow direction alternates between right and left and that further, the coolest fluid leaving is adjacent to the hottest fluid entering. The hot fluid is located at the outside so that it may compensate for higher heat loss on the edges. A point on the surface of the heat exchanger would reflect the temperatures of the effect of channels 2 and 16 and perhaps others. Since 2 contains some of the hottest fluid and 16 contains some of the coolest, the chosen point will reflect some average between the two. For the next set of channels up (6 and 16), the mean temperature is between the cooler channel 16 and the hotter channel 6. Channel 6 is cooler than channel 2, so that the point between 16 and 6 might be expected to be cooler than a point between 2 and 6. However, all points on the surface are impacted by more than just the two adjacent channels. Further, the difference between 2 and 6 is much less than the difference between 2 and 16 so that points near 16 are influenced by two relatively hot channels and one cool channel. Similar arguments can be applied to the remaining sections of the heat exchanger. We have found that with proper design of the heat exchanger the effect of the double spiral pattern is to provide surface temperature uniformity better than is achievable with other arrangements of fluid flow. We recognize that phase change fluids (e.g., condensing steam), can provide a more uniform temperature. However, in many applications the use of circulated fluid is beneficial in that pressure may be kept low and temperature is more easily varied.

The critical aspect of the design is to provide a sufficiently thick plate to even out temperatures between channels yet maintain significant separation between channels. The design shown with 0.625 inch-wide channels and 0.750 inch land areas separating the channels is satisfactory for fluids entering at 450° F. and experience a 30- to 40-degree drop between inlet and outlet. In this case, temperatures on the platen have been measured to be within ±5° Fahrenheit over the entire surface with the exception of the corners which are at a lower temperature.

The design of the heat exchanger is preferably accomplished by conventional mechanical engineering techniques for heat conduction and convection. A variety of manual and computer methods are available and will be recognized by the person skilled in heat transfer analysis. However, the convoluted spiral path could make the analysis difficult except that we have found that analysis of a simple two-dimensional model is sufficient to insure good, uniform surface temperatures over the platen when coupled with a simple crosstalk model for the entire channel. Crosstalk between channels is important because excessive crosstalk can lead to very non-uniform temperatures in this design. Specifically, the center of the platen may be much cooler than the edges if heat transfer between channels is too great.

Figure 19:
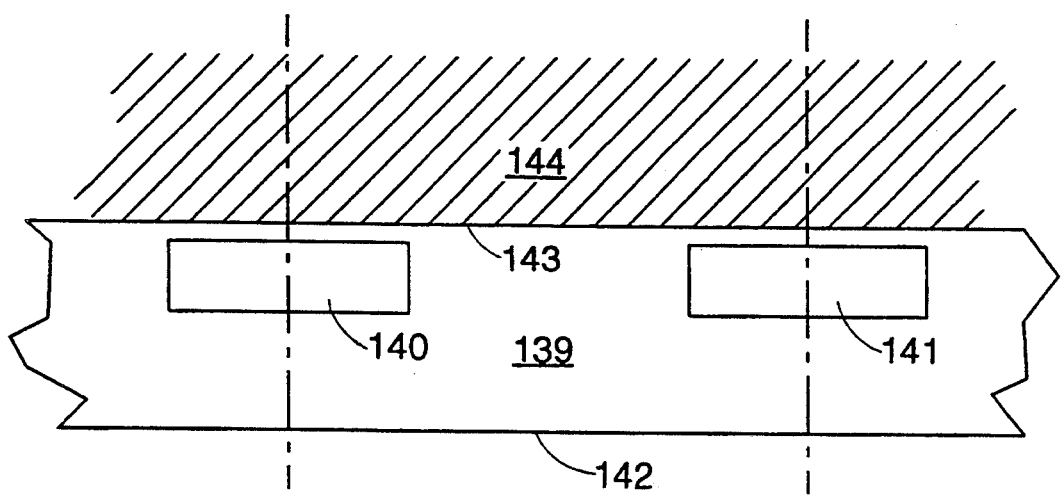
FIG. 19 is a schematic cross-sectional view of two adjacent channels in a heat exchanger as in FIGS. 16–18, illustrating typical methods of two-dimensional modeling to determine substantially optimal dimensions therein.

FIG. 19 is a cross-section of a two-channel model pair 140,141 in an area 139 that is to be modeled. We have found that if this configuration is analyzed by conventional means so that the surface temperature uniformity over the load surface 142 is satisfactory with one channel 140 at the inlet temperature and one channel 141 at the desired outlet temperature, then all points on the heat exchanger will be within tolerance provided that the channel is not too long. The two-dimensional model provides an estimate of the heat transfer rate between the channels 140,141 and the heat transfer to the load at the surface 142. The opposite surface 143 is backed with insulation 144.

Figure 20:
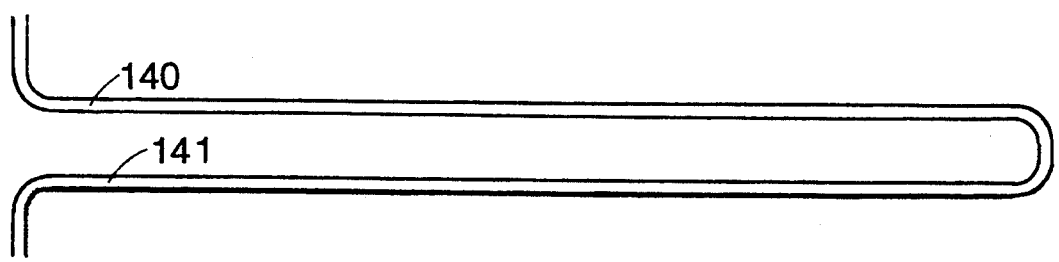
FIG. 20 is a schematic drawing generically representing the channel in a heat exchanger as in FIGS. 16–18, and illustrating a simplified model to calculate the temperature along the length of the channel.

These values can be incorporated into a simplified model to assess the temperatures along the full length of the channel allowing for crosstalk between only the inlet 140 and outlet 141 channels as shown in FIG. 20.

Figure 21:
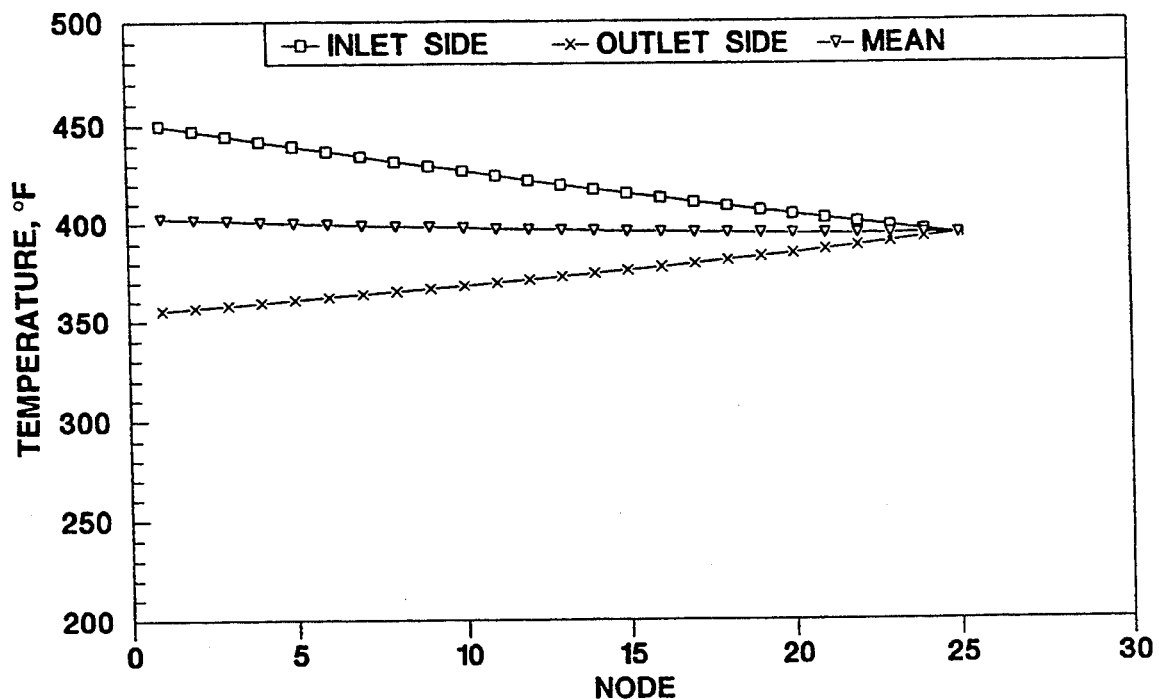
FIG. 21 is a graph of temperature versus length at successive points along the inlet half of the channel and at adjacent points along the outlet half of the channel for a welldesigned heat exchanger according to the present invention.

FIG. 21 is a plot of temperatures obtained with a properly designed heat exchanger. Clearly the temperature between the two channels will be the average between the two sides and is approximately constant for the entire length.

Figure 22:
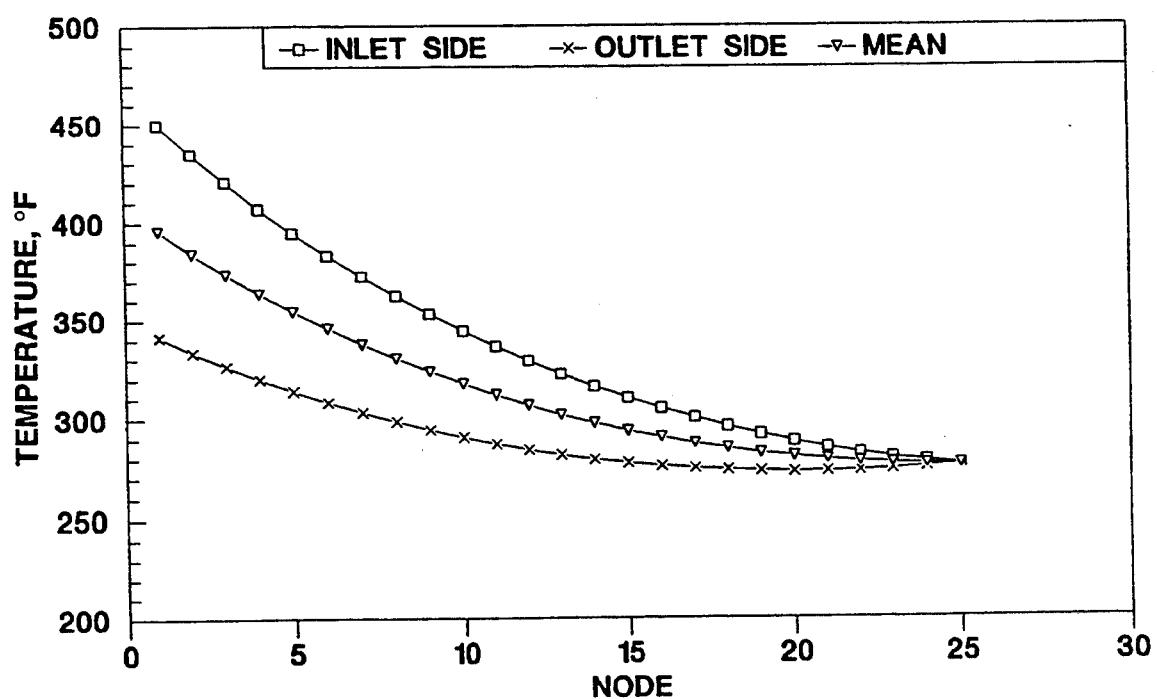
FIG. 22 is a graph similar to FIG. 21 for a heat exchanger of the same general type, poorly designed.

FIG. 22 is a similar plot for a heat exchanger where the channel is too long, or where the crosstalk between channels is allowed to be too great by not providing a wide enough land area between channels. This design would result in a cool center on the platen because the fluid leaving picks up energy from the entering fluid, causing the entering fluid to cool off too fast.

The design presented here, 8 passes in a 11.5 inches wide, 28.5 inches long heat exchanger with 0.75-inch separation between channels and a minimum 5/16-inch plate on the side of the heat exchanger which is to be maintained at a uniform temperature, has been shown to be satisfactory. By proper application of the double spiral technique and engineering analysis described above, other configurations can be devised that achieve equal or superior results.

While the forms of the invention herein disclosed constitute currently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. Double-sided griddle apparatus for cooking an item of food having lower and upper surfaces;
   said apparatus comprising
   A. a lower platen having a substantially flat horizontal heated upper surface for contacting the lower surface of the item of food while it is resting thereon, to cook at least a lower portion of the food;
   B. an upper platen having a substantially flat heated lower surface for contacting the upper surface of the said item of food, to cook at least an upper portion of the food; and
   C. means for positioning the upper platen in a predetermined sequence before, during, and after cooking;
   said positioning means comprising
   D. means for permitting movement of the upper platen from a predetermined position with its lower surface at an angle to the horizontal plane, and into a predetermined position with the lower surface of the upper platen horizontal and directly above and parallel to the upper surface of the lower platen, to begin a cooking cycle;
   E. means for then providing vertically downward movement of the upper platen to press the lower surface thereof downward against the upper surface of the food until the lower surface of the upper platen reaches a predetermined level above the upper surface of the lower platen;
   F. means for stopping the vertically downward movement of the upper platen at the said predetermined level;
   G. means for providing a signal upon the attainment of a selected condition in the food or the apparatus, or after a predetermined time; and
   H. means responsive to the said signal for lifting the upper platen away from the food, and thus to end the cooking cycle.

2. Apparatus as in claim 1, wherein the upper platen has front, rear, and side ends and is fixedly held in a combined housing and support in the apparatus; the said combined housing and support having, near the rear end of the upper platen, a pivot point about which the combined housing and support is rotatable through an angle of at least about 60 degrees; allowing the upper platen to be lowered to a horizontal position parallel to the lower platen, for cooking, and raised by the lifting means to a near vertical position, to permit convenient loading and unloading of food onto and away from the lower platen.

3. Apparatus as in claim 2, wherein the combined housing and support is pivotably mounted, at the said pivot point, on a vertically movable assembly in the apparatus that permits the upper platen to move vertically downward during cooking of the food, while remaining horizontal and thus parallel to the lower platen.

4. Apparatus as in claim 1, wherein the stopping means comprises a limiting stop member for stopping the downward travel of the upper platen at the predetermined level above the upper surface of the lower platen.

5. Apparatus as in claim 3, wherein the lifting means comprises a raising and counterbalancing spring for raising the upper platen at the end of each cooking cycle to a near vertical position and holding it there.

6. Apparatus as in claim 5, comprising also the following recited components, and wherein there is provided means for holding the raising and counterbalancing spring in compression between a first end of an elongate cantilever housing, in the combined housing and support, and one end of a rod that extends through said first end and is lengthwise movable in, and relative to, the said cantilever housing; the other end of said rod being connected pivotably to an upper pivot point on a vertical bar in the vertically movable assembly, and the opposite, second, end of said cantilever housing being connected pivotably to a pivot point just above the front end of the upper platen; so that the said spring urges the cantilever housing toward the said upper pivot point and, when not prevented by a latch in the housing and support that selectively at a lower position of the latch prevents pivotable movement of the housing and support and at higher positions of the latch permits such movement, pulls the said opposite end of the cantilever housing in the direction toward the said upper pivot point; and thus swings the housing and support upward about a lower pivot point on the vertical bar in the vertical movable assembly; the housing and support being pivotably connected, at a point therein behind the rear end of the upper platen, to the said lower pivot point on the vertical bar.

7. Apparatus as in claim 3, comprising also a vertically downward compressible spring supporting the vertically movable assembly, for counterbalancing the weight of the said assembly, to control the force placed on the food between the lower surface of the upper platen and the upper surface of the lower platen.

8. Apparatus as in claim 3, wherein the vertically movable assembly comprises a first elongate vertical bar, a first substantially shorter approximately horizontal bar, pivotably connected at one end to a point near the upper end of the first elongate vertical bar, a second similar substantially shorter approximately horizontal bar pivotably connected at one end to a point near the lower end of the first elongate vertical bar; and wherein a second elongate vertical bar, held fixedly at its lower end and at its upper end fixedly supporting the lower platen, is pivotably connected near its upper end with the other end of the first shorter bar, and is pivotably connected near its lower end with the other end of the second shorter bar;

whereby the four bars together form a vertically long and horizontally short parallelogram, which is a rectangle when the shorter bars are horizontal, and in which the first elongate vertical bar can move a substantial distance in the vertical direction with only negligible concomitant horizontal movement.

* * * * *